(12) United States Patent
Ibrahim

(10) Patent No.: US 9,037,404 B2
(45) Date of Patent: May 19, 2015

(54) SYSTEM AND METHOD FOR MAP MATCHING

(71) Applicant: Faroog Ibrahim, Dearborn Heights, MI (US)

(72) Inventor: Faroog Ibrahim, Dearborn Heights, MI (US)

(73) Assignee: SAVARI, INC., Santa Clara, CA (US)

( * ) Notice: Subject to any disclaimer, the term of this patent is extended or adjusted under 35 U.S.C. 154(b) by 123 days.

(21) Appl. No.: 14/047,157

(22) Filed: Oct. 7, 2013

(65) Prior Publication Data

US 2014/0358322 A1    Dec. 4, 2014

Related U.S. Application Data

(63) Continuation-in-part of application No. 13/907,864, filed on Jun. 1, 2013, and a continuation-in-part of application No. 13/907,862, filed on Jun. 1, 2013, now Pat. No. 8,892,347.

(51) Int. Cl.
*G01C 21/00* (2006.01)
*G05D 1/00* (2006.01)

(52) U.S. Cl.
CPC .................................. *G05D 1/0055* (2013.01)

(58) Field of Classification Search
USPC .............................. 701/1, 117, 408, 409, 446
See application file for complete search history.

(56) References Cited

U.S. PATENT DOCUMENTS

| | | | |
|---|---|---|---|
| 8,363,104 B2 * | 1/2013 | Imai et al. ...................... 348/149 |
| 2008/0077322 A1 * | 3/2008 | Sumizawa .................... 701/210 |
| 2012/0245833 A1 * | 9/2012 | Zaitsu et al. ................... 701/117 |
| 2013/0050491 A1 * | 2/2013 | Lin et al. ....................... 348/148 |

* cited by examiner

*Primary Examiner* — Kim T Nguyen
(74) *Attorney, Agent, or Firm* — Maxvalueip LLC

(57) ABSTRACT

In one example, we describe a method, system, and infrastructure for dealing with lane-level matching problem, and provide different methods of estimating position corrections, position and map matched confidence, self-correcting map matching (i.e., Map Matching Algorithm (at lane-level)), and turning and lane change events. On the top of the described algorithms, the V2V data, when available, can be used to help the entire discussed algorithm steps. If the relative GPS accuracy between the host vehicle and the remote vehicles in the proximity of the host vehicle is enough to separate vehicle in lane, and there are enough vehicles to exist in all lanes of interest, then it becomes an easier job to determine which lane the host vehicle is in, and this can reflect very positively on all the above algorithm steps.

21 Claims, 36 Drawing Sheets

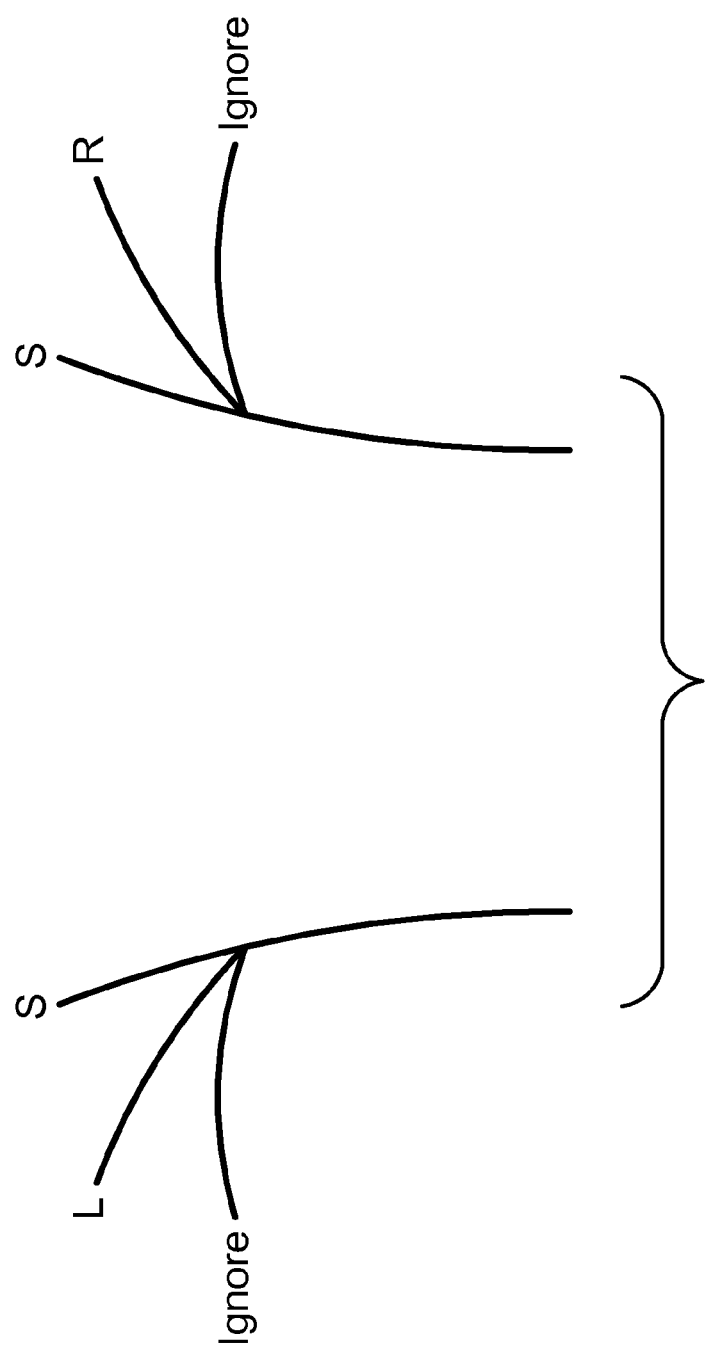

SYSTEM AND METHOD FOR MAP MATCHING

RELATED APPLICATIONS

This application is a CIP of two other co-pending US utility applications, namely, Ser. No. 13/907,864, titled "System and method for lane boundary estimation and host vehicle position and orientation", filed 1 Jun. 2013, and Ser. No. 13/907,862, titled "System and method for node adaptive filtering and congestion control for safety and mobility applications toward automated vehicles system", filed 1 Jun. 2013. The teachings of the above applications are incorporated herein, by reference. The current application claims the priority date of the above applications.

BACKGROUND OF THE INVENTION

Map matching algorithms are well known in the industry and used extensively for the land vehicle positioning/navigation systems. First, maps were generated, mainly using aerial images, and commercial navigation system started with GPS accuracy below 100 meter. Then, GPS accuracy became better to below 10 meter, and the map accuracy also increased (in most of road classes) to around 5 meter for absolute accuracy and 1 meter for relative accuracy. In all cases, the resulted map matched position has better lateral accuracy than the stand-alone GPS accuracy.

Now, with the differential correction like the Wide Area Augmentation System (WAAS), the GPS accuracy can go below 1.5 meter. Most of the V2X (vehicle to infrastructure plus vehicle) safety (especially urban road intersection safety) and mobility application requires lane level position accuracy. Automated vehicle in most of its levels requires lane level position accuracy. Therefore, accurate road representation map is very critical in making automated vehicle reality, and getting the maximum benefit from the V2X technology. Thus, matching the vehicle position to the true lane is a key step. However, GPS accuracy can be severely degraded in urban areas especially with tall building and green areas with significant tree existence. In addition, road geometry can be complex and ambiguous, such as road branching. Finally, vehicle dynamics such as lane change and turning can also complicate the map matching problem.

Below, we present a system and method that is capable of dealing with lane level matching problem, and provide different methods of estimating position corrections, position and map matched confidence, and self-correcting map matching (i.e., Map Matching Algorithm (at lane-level)).

One aspect of the present invention relates to or combines with a system that uses the Vehicle to Vehicle (V2V) and/or the Vehicle to infrastructure communication for safety and mobility applications. The invention provides methods and systems to make the V2X realized and effectively used in any intelligent transportation system toward automated vehicle system. This can be used for more safety and/or more automation.

The safety, health, and cost of accidents (on both humans and properties) are major concerns for all citizens, local and Federal governments, cities, insurance companies (both for vehicles and humans), health organizations, and the Congress (especially due to the budget cuts, in every level). People inherently make a lot of mistakes during driving (and cause accidents), due to the lack of sleep, various distractions, talking to others in the vehicle, fast driving, long driving, heavy traffic, rain, snow, fog, ice, or too much drinking. If we can make the driving more automated by implementing different scale of safety applications and even controlling the motion of the vehicle for longer period of driving, that saves many lives and potentially billions of dollars each year, in US and other countries. We introduce here an automated vehicle infrastructure and control systems and methods, and its related technologies.

SUMMARY OF THE INVENTION

The following invention/embodiments present a system and method that is capable of dealing with lane level matching problem, and provide different methods of estimating position corrections, position and map matched confidence, and self-correcting map matching (i.e., Map Matching Algorithm (at lane-level)).

On the top of the described algorithms, the V2V data, when available, can be used to help the entire discussed algorithm steps. If the relative GPS accuracy between the host vehicle and the remote vehicles in the proximity of the host vehicle is enough to separate vehicle in lane, and there are enough vehicles to exist in all lanes of interest, then it becomes an easier job to determine which lane the host vehicle is in, and this can reflect very positively on all the above algorithm steps.

BRIEF DESCRIPTION OF THE DRAWINGS

FIG. 27 is for one embodiment of the invention, for a method for map matching algorithm.

DETAILED DESCRIPTION OF THE PREFERRED EMBODIMENTS

Here, we describe an embodiment of the invention, using an example: (referring to FIGS. 37-38)

Figure 37:
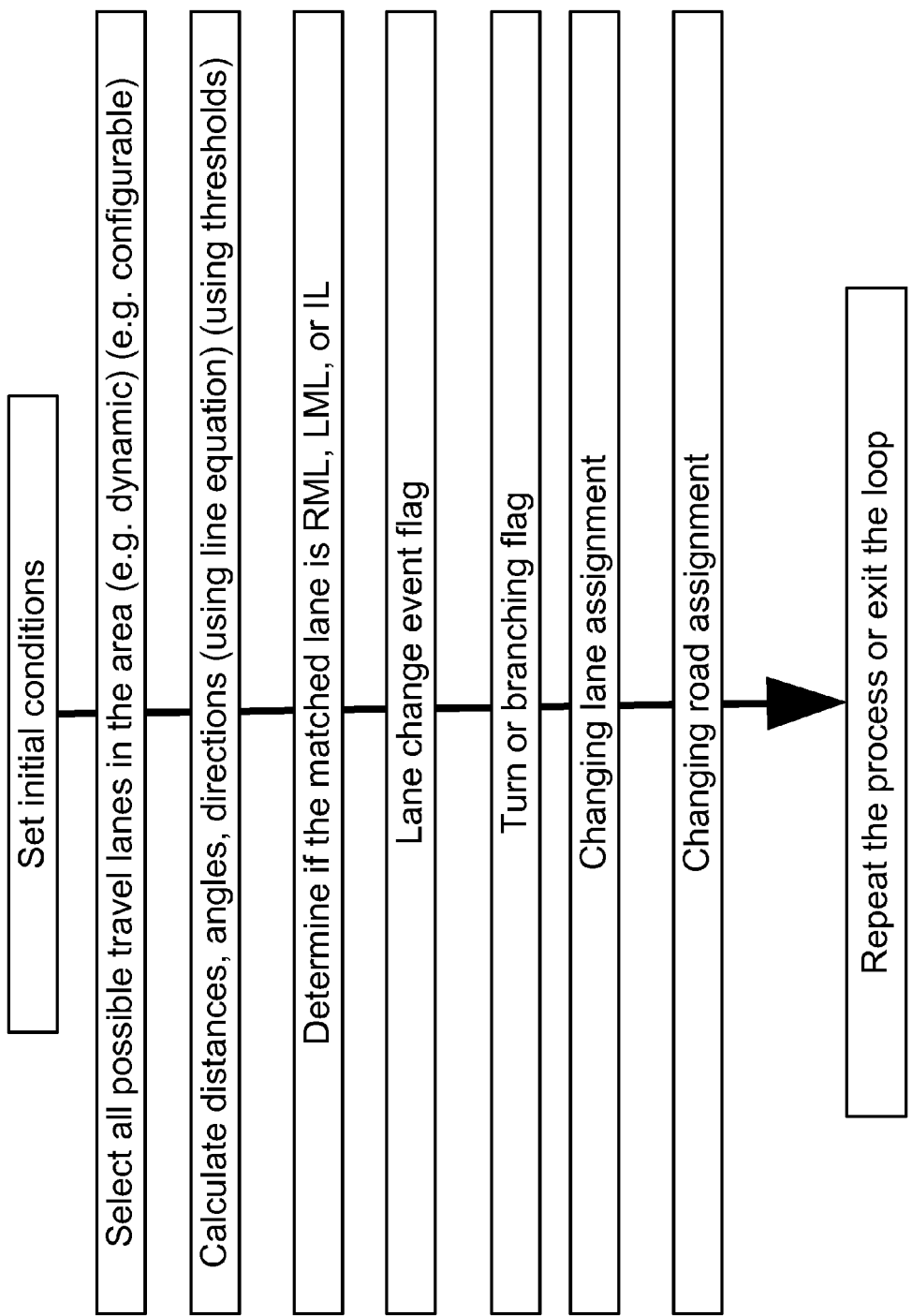
FIG. 37 is for one embodiment of the invention, related to a method or steps taken for map matching.

FIG. 37 is for one embodiment of the invention, related to a method or steps taken for map matching. It starts from setting the initial conditions. Then, it selects all possible travel lanes in the area. It determines distances, angles, and directions. It uses the equation of line for this step. Then, it determines the type of the matched lane. It applies the lane change event flag, followed by application of the turn or branching flag. Then, it performs the changing lane assignment, followed by changing road assignment. Then, it can repeat this process again, or if the tasks are complete, it can exit the loop and process. More details are given below in each section corresponding to each of the 7 steps.

Figure 38:
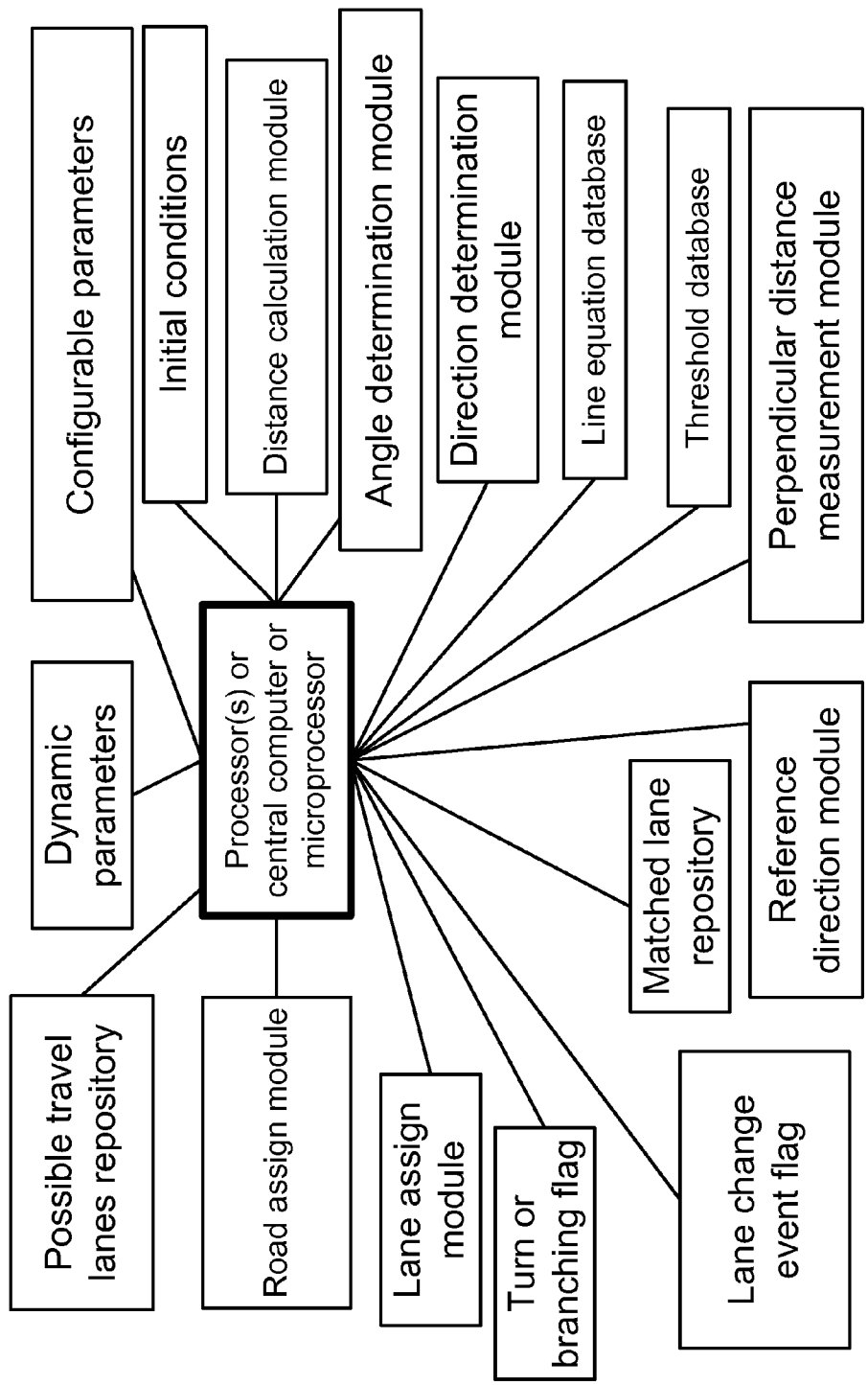
FIG. 38 is for one embodiment of the invention, related to a system for map matching.

FIG. 38 is for one embodiment of the invention, related to a system for map matching. The system has a travel lane repository, using dynamic and configurable parameters. It sets the initial conditions or parameters. It uses the distance calculation module, angle determination module, direction determination module (using line equation), perpendicular distance measurement module, and reference direction module, based on threshold numbers or parameters for comparisons and rules, for decision making. It applies the matched lane repository, as well as flags for lane change event and turn or branching events. It communicates with a lane assign module and a road assign module, through a processor or computer. More details are given below.

Figure 18:
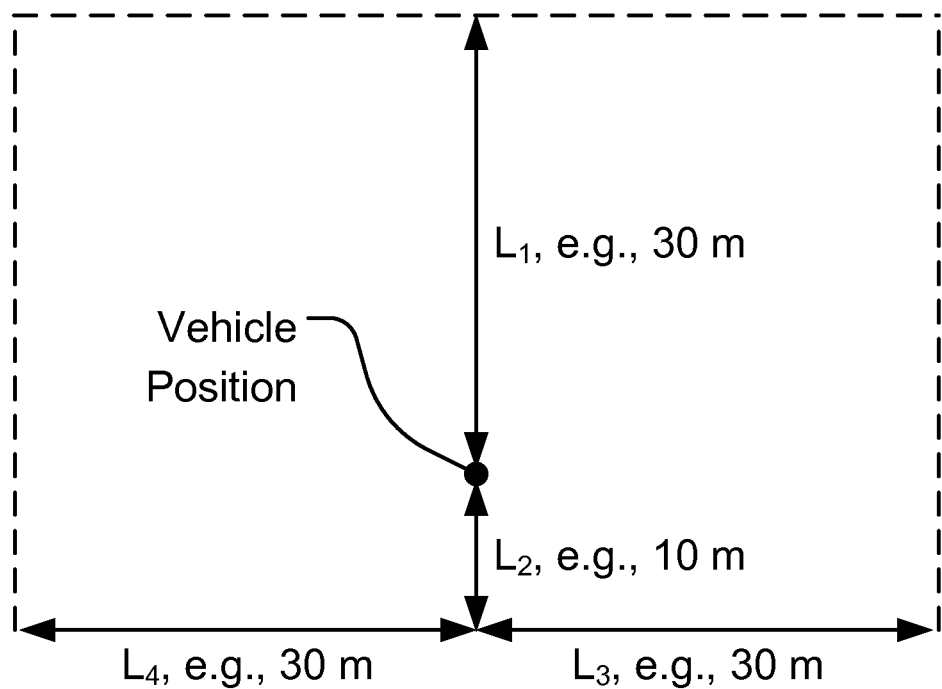
FIG. 18 is for one embodiment of the invention, for a method for map matching algorithm.

Pre-Processing:
Using/setting the initial conditions:
Conf-position=High (confidence on position)
Or CP=High
Cnt=0 (time counter)
Correction=0
Conf-match=Low (confidence on match)
Or CM=Low
Now, we have step 1 as:
Select all possible travel lanes in the area, as shown in FIG. 18. The area is configurable and can be dynamic in one embodiment.

Figure 19:
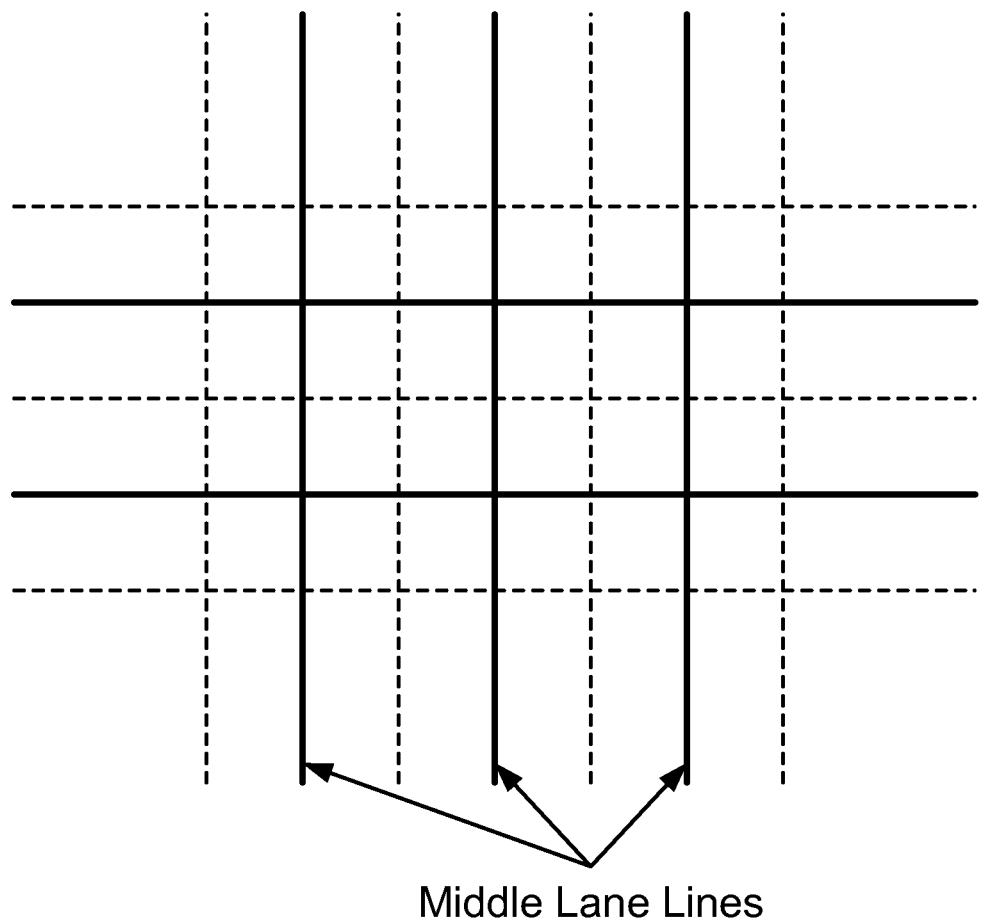
FIG. 19 is for one embodiment of the invention, for a method for map matching algorithm.
Figure 20:
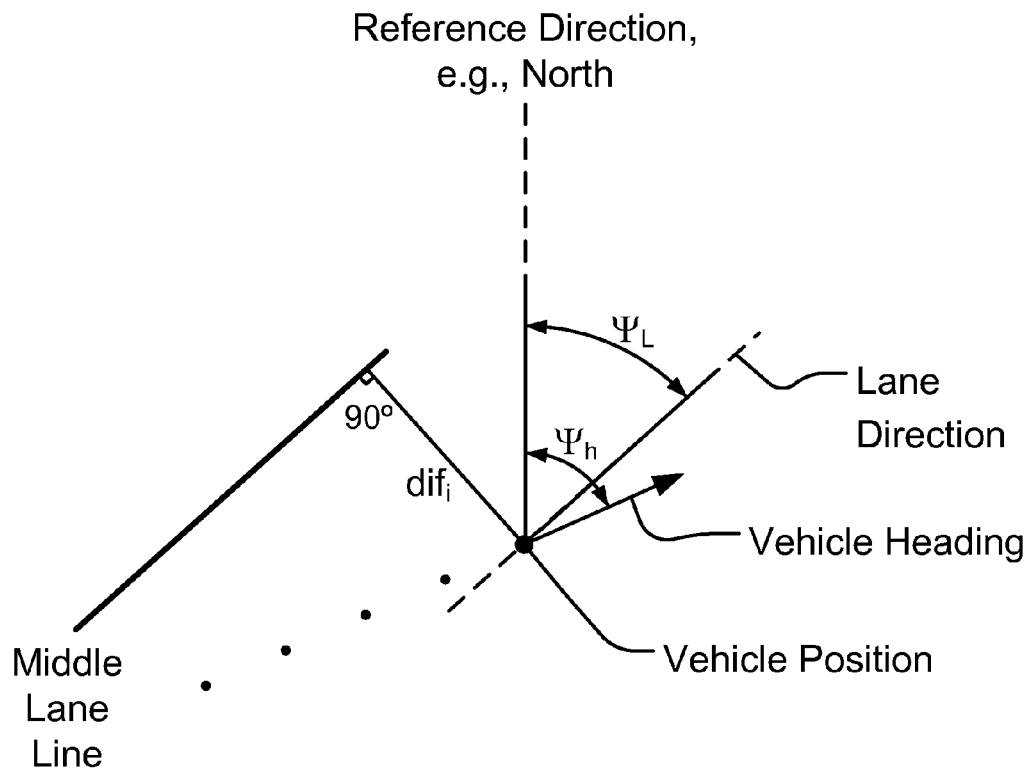
FIG. 20 is for one embodiment of the invention, for a method for map matching algorithm.
Figure 21:
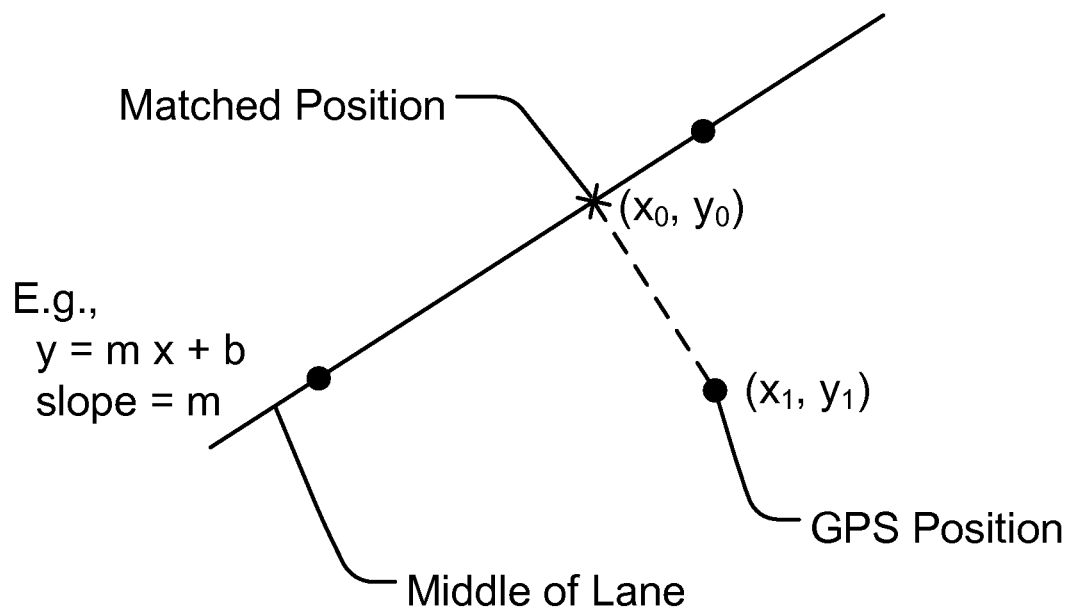
FIG. 21 is for one embodiment of the invention, for a method for map matching algorithm.

On coming lanes must be filtered out.
For step 2:
We have middle lanes lines, as shown in FIG. 19.
Referring to FIG. 20, we calculate difi distance for each lane. (difi distance is the perpendicular distance.)
We calculate $\psi_L$ for the heading or direction of the lane.
Then, we have heading of the vehicle (or direction or vector), with respect to North direction, denoted by $\psi_h$.
We match the vehicle position to the lane that has:

$$\mathrm{Min}\{|\mathrm{dif}1|,|\mathrm{dif}2|,\ldots,|\mathrm{dif}n|\}$$

and has:

$$|\psi_h-\psi_L|<G \text{ degrees}$$

Wherein G is configurable.
For example, G is 5 degrees.
Now, referring to FIG. 21, we have:

$$y=mx+b$$

with m denoting the slope.
So, we have:

$$x_0=(my_1+x_1-mb)/(m^2+1)$$

$$y_0=(m^2y_1+mx_1+b)/(m^2+1)$$

$$\mathrm{dif}=|y_1-mx_1-b|/\sqrt{(m^2+1)}$$

wherein $\sqrt{(\ldots)}$ denotes the square root of a value.
Or:

$$\mathrm{dif}=|Ax_1+By_1+C|/\sqrt{(A^2+B^2)}$$

for line equation of:

$$Ax+By+C=0$$

Figure 22:
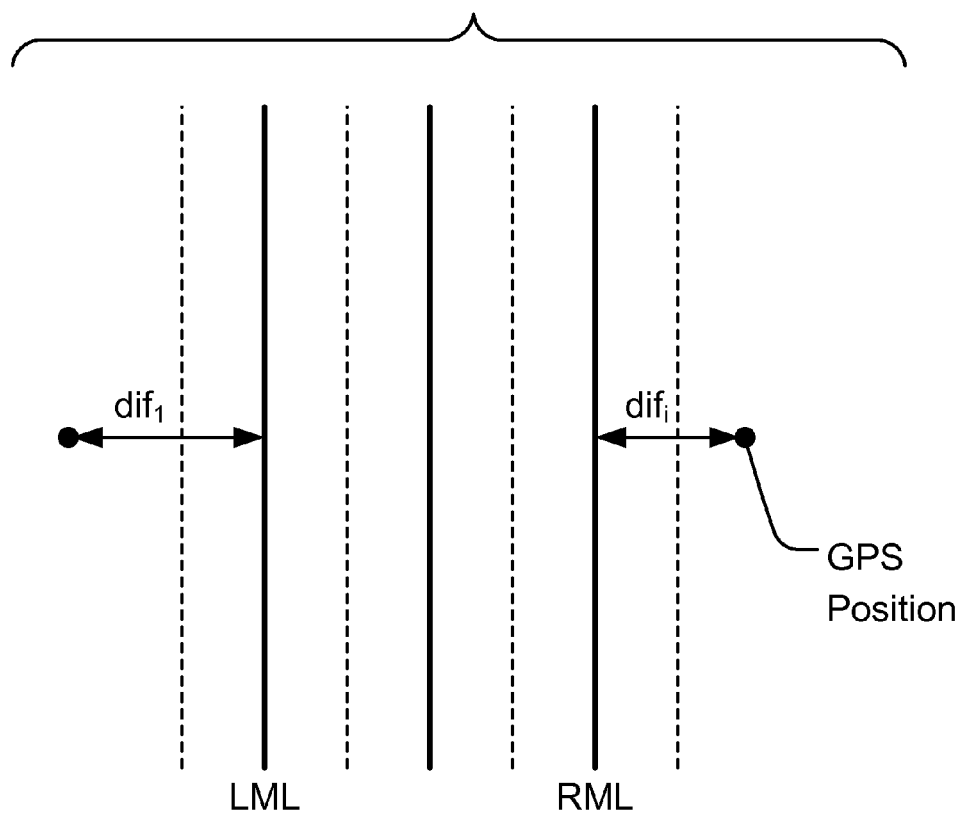
FIG. 22 is for one embodiment of the invention, for a method for map matching algorithm.

Step 3:
Determine if the matched lane is Right Most Lane (RML) or Left Most Lane (LML) or Inner Lane (IL). (referring to FIG. 22)
If RML and difi to the right and |difi|>E
Or
LML and difi to the left and |difi|>E
Wherein E=1 m, as an example.
Then:
CM=MED
CP=LOW Else:
If |difi|≤E
For example:
If |difi|≤1 m
Then:
CM=MED
CP=MED
Else:
CM=LOW
CP=LOW Note that, instead of LOW, MED, and HIGH, we can replace them by numbers, e.g., integers, e.g., 1, 2, and 3, respectively (or, e.g., 100, 200, and 300, respectively).

Figure 23:
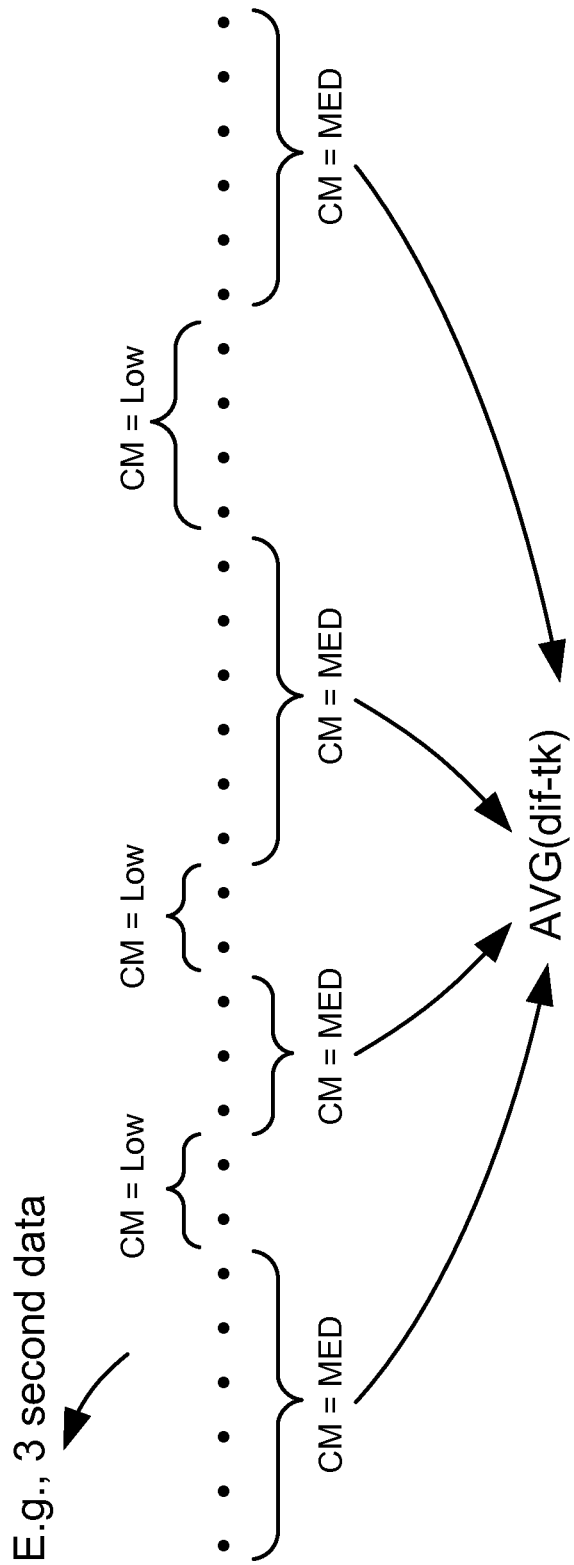
FIG. 23 is for one embodiment of the invention, for a method for map matching algorithm.

In the last J (e.g., 3 sec) period, if we have for (L≤), or e.g., (70%≤), or (at least 70 percent of the time), the confidence level CM is MED,
Then:
CM becomes HIGH
Or
CM=HIGH $$Correction = AVERAGE(dif\_tk)|_{when\ CM=MED}$$

Wherein tk extends from 3 sec prior till the current time. The 3 sec is configurable. (referring to FIG. 23)

Figure 24:
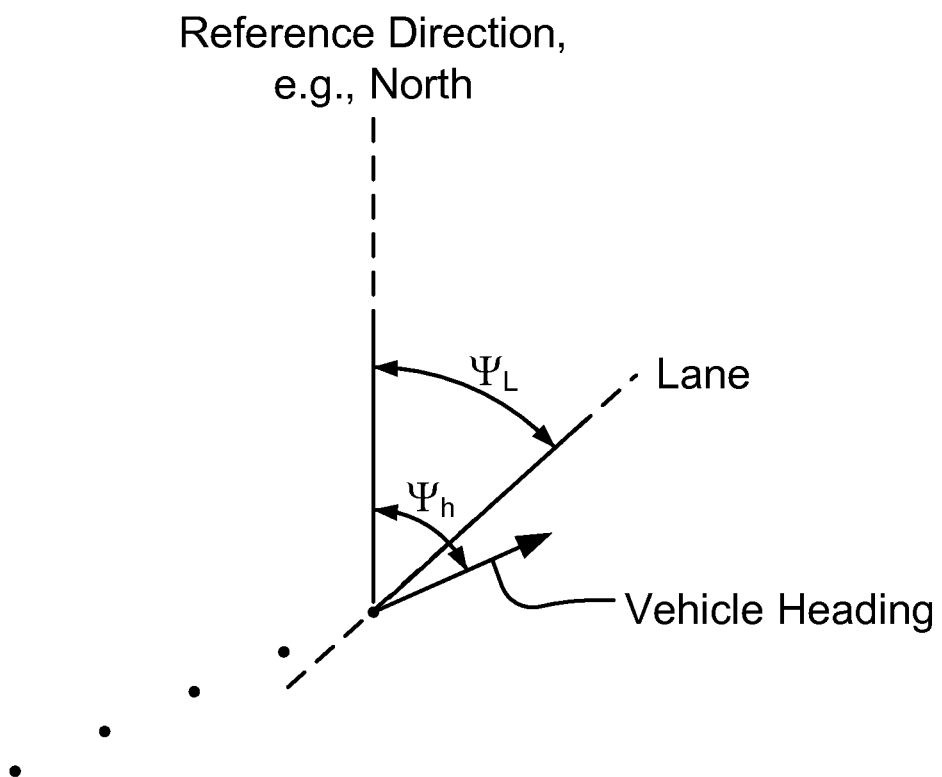
FIG. 24 is for one embodiment of the invention, for a method for map matching algorithm.

Step 4:
Lane change event flag:
We calculate the vehicle heading angle with respect to the lane $\psi$. (referring to FIG. 24)

$$\psi = \psi_h - \psi_L$$

$\psi_L$ is either given or can be calculated from the surrounding two shape points.

Given the vehicle speed $V_h$ lower the past $t_{Past}$ period (e.g., $t_{Past}$=2.5 sec, which is a configurable parameter), and the calculated $\psi$ over the past $t_{Past}$ period, then the following is performed:

(a) for each $\psi_i$, the following operation is executed:

If $\psi_i \leq g_{threshold}$ (e.g., $g_{threshold}$=0.5 deg)
Then $$\psi_i = 0$$

Else set $$\psi_i = \psi_i - 0.5, if\ \psi_i > 0.5$$

$$\psi_i = \psi_i + 0.5, if\ \psi_i < -0.5$$

Please note that the values above are in degrees. If one works in radians, then they all should be converted, accordingly.

(b) calculate $$d_L = \Sigma_t \psi_i V_{hi}(0.1\ sec)$$

wherein (0.1 sec) is a configurable parameter and depends on the data update rate.
wherein $-2.5 < t < 0$ sec.
wherein $-2.5$ sec is a configurable parameter.

if $|d_L| > d_{threshold}$  (c)

wherein $d_{threshold}$ is configurable, e.g. equal to 1 m.
AND

Max($|\psi_i|$)<1.5 degrees

Wherein 1.5 degree is a configurable parameter.
Then
LaneChangeFlag (or LCF)=HIGH=1

Figure 25:
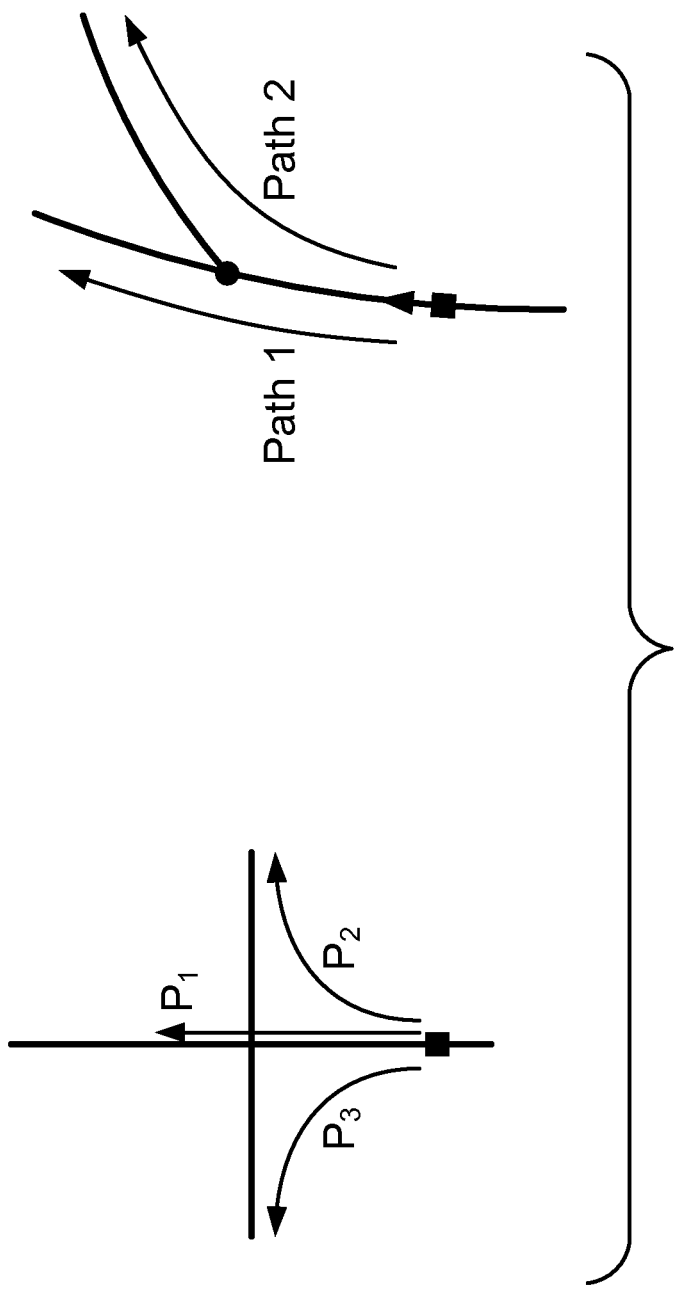
FIG. 25 is for one embodiment of the invention, for a method for map matching algorithm.

Step 5:
Turn or branching flag:
Branching is defined when there is more than one likely driving path for the vehicle. (See FIG. 25.)

Within the 40 m ($d_{aa}$, configurable parameter, distance, e.g., before the intersection or split or branching, e.g., in meter), determine if multiple paths are possible based on the current position of the vehicle.

Figure 26:
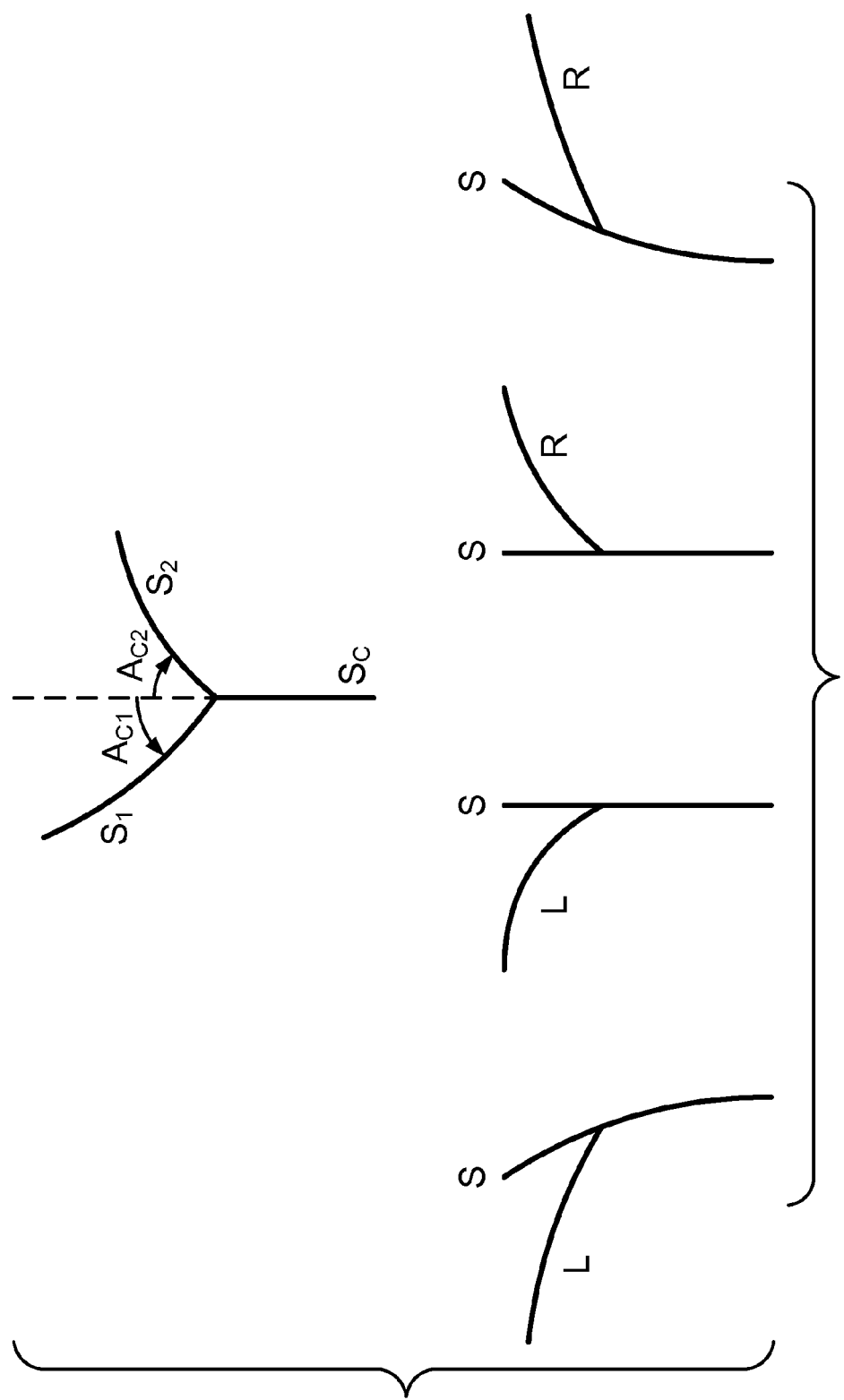
FIG. 26 is for one embodiment of the invention, for a method for map matching algorithm.
Figure 29:
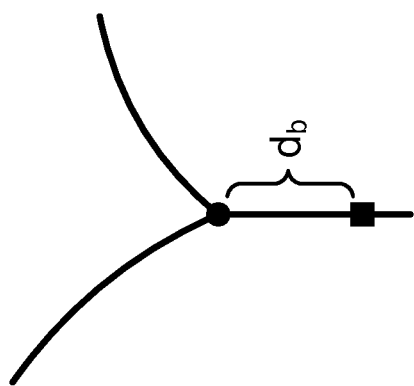
FIG. 29 is for one embodiment of the invention, for a method for map matching algorithm.
Figure 28:
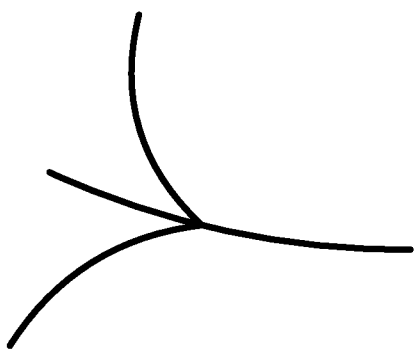
FIG. 28 is for one embodiment of the invention, for a method for map matching algorithm.

Classify them as Straight (S), Right (R), and Left (L). If the classification does not exist in the map data, use the rule below, or similar rules:

If one path, then it is always Straight (S).
If more than one path, then multiple possibilities:
(a) For two paths: (from FIG. 26, for the angles shown in the figure)
If min ($|A_{C1}|$, $|A_{C2}|$)<10°
Then: This min. corresponds to the straight path.
In this case, e.g., it is $S_CS_1$.
Then, $S_CS_2$ will be R or L, depending on its location from $S_CS_1$.
But if min ($|A_{C1}|$, $|A_{C2}|$)>10°
Then: if both Angles have the same sign, then the smallest |Angle| corresponds to the S, and the other one corresponds to R or L.
But, if the Angles signs are different, then the right one is R and the left one is L.
(b) For three paths: (See FIG. 27)
When all 3 have same sign, then min |Ang| is S.
Next Ang is R or L.
Third Ang: Ignore.
When different signs: (See FIG. 28)
Then:
Max (Right) is R,
Max (Left) is L,
Min is S.
Now, calculate the distance to the branching point:

When $d_b$<10 m (10 m, or $d_{bb}$, which is a threshold parameter, configurable, e.g., in meter, for distance) (See FIG. 29)

Figure 30:
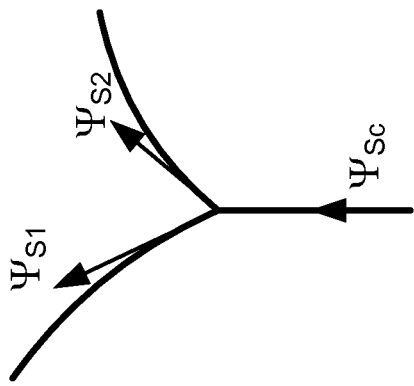
FIG. 30 is for one embodiment of the invention, for a method for map matching algorithm.

Compare the vehicle heading $\psi_{S2}$ with the heading of the current segment, and the heading of the segments after branching. (See FIG. 30)

If $V_h$ is closer to $\psi_R$ or $\psi_L$, than to $\psi_S$ and $\psi_C$, then:
Vehicle-is-Turning=1
If LaneChangeFlag=1 and
VehicleIsTurning=1, then:
We clear the LaneChangeFlag to zero (set to zero).
Note that: So far, we have established methods for:
Matching a position to a lane, or assign a lane to the vehicle position
Generate the different type of confidences
Classify the upcoming road geometry (L, S, R)
Determine a lane-change-event
Determine a turn or a road-change event Now, we use these data, in addition to the current and previous GPS positions, to determine if a changing lane or road assignment is required.

Step 6:
Changing Lane Assignment:
Lane assignment will change based on the following rules, as an example:
If CurrentLaneAssignment is ((RML & RightLaneChangeEvent is high)
OR
(LML & LeftLaneChangeEvent is high))

AND
  DistanceToBranch>$t_{cc}V_h$
Wherein $t_{cc}$ is a configurable parameter, e.g., 4 sec.
Then: any current or previous assignment was wrong;
& now, it is correct after the lane change.
Thus: (refer to FIG. 35)
NewCurrentAssignment=PreviousCurrentAssignment
(RML, or LML)
  Correction=AVG (dif_tk)
  CM=high
  CP=low
  If CurrentLaneAssignment is ((RML & No Right Lane
    Change & position jumps further more to the right)
    OR
    (LML & No Left Lane Change & position jumps further
      more to the left))
  Then: (refer to FIG. 33)
  No change in the lane assignment
  CP=low
  If the new position stays in the new locations with high |dif|
for $t_{dd}$ or more time period (wherein $t_{dd}$ is configurable time
period, e.g., 3 sec), then:
    CM=high
    CP=low
  If CurrentLaneAssignment is ((RML & Left Lane Change)
    OR
    (LML & Right Lane Change) OR
    (Inner Lane & Lane Change (L or R)))
  Then: (refer to FIG. 34)

Figure 31:
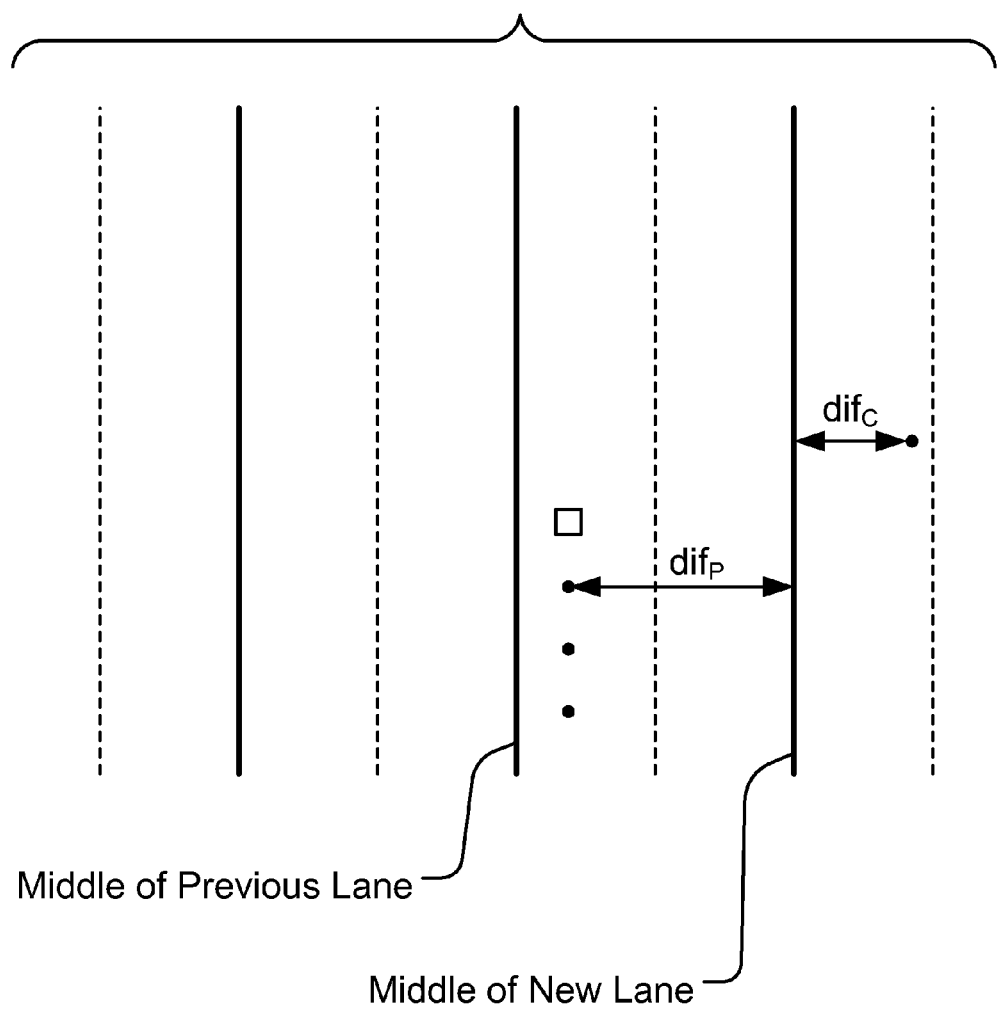
FIG. 31 is for one embodiment of the invention, for a method for map matching algorithm.

If |difi|<$d_{ee}$ (for the new lane)

Wherein $d_{ee}$ is configurable distance, e.g., 1.5 m
  Then:
  NewLaneAssignment=New Lane
  CM=high
  When jump in the position to a new lane happens,
    |difi|<1.5,
  A new lane assignment will happen only if (|difi|<1.5 m)
stays for $t_{ff}$
  Wherein $t_{ff}$ is configurable time period, e.g., 3 sec
  Then: (refer to FIG. 36)
  CM=low
  CP=low
  After this $t_{ff}$ period, a new timer starts from zero, and rules
in step 3 (described above) apply (repeat step 3)
  When transition to new lane happens gradually (no jump is
    detected & no lane change is detected), then:
  A new lane assignment happens only if (|difi|<1.5 m) stays
for $t_{gg}$
  Wherein $t_{gg}$ is configurable time period, e.g., 0.7 sec
  Then (keep the same):
  CM=CM
  CP=CP
  After this $t_{gg}$, a new timer starts from zero, and rules in step
3 (described above) apply (repeat step 3)
  Note:
  Jump is detected as follows:
  If (|difc−difp|>$d_{hh}$)
  Wherein $d_{hh}$ is configurable distance, e.g., 0.5 m
  Wherein difc and difp correspond to middle of new lane
and middle of previous lane, respectively. (See FIG. 31, as
well.)
  Then:
  Jump is detected.
  Time difference between difc & difp is close to $t_{ii}$.
  Wherein $t_{ii}$ is a configurable time period, e.g., 0.1 sec (note:
due to, e.g., the 10 Hz update).

Step 7:
Changing road assignment:
If Turn=yes (high)
If |difi| is closer to the new road

|difnew|<$d_{kk}$

Wherein $d_{kk}$ is a configurable distance, e.g., 1.5 m,
  Wherein difnew corresponds to distance for new road,
  Then:
  ChangeRoad=yes &
  Match to the new road
  Else:
  No road change
Else (Turn=no)
If |difi| is closer to the new road

Figure 32:
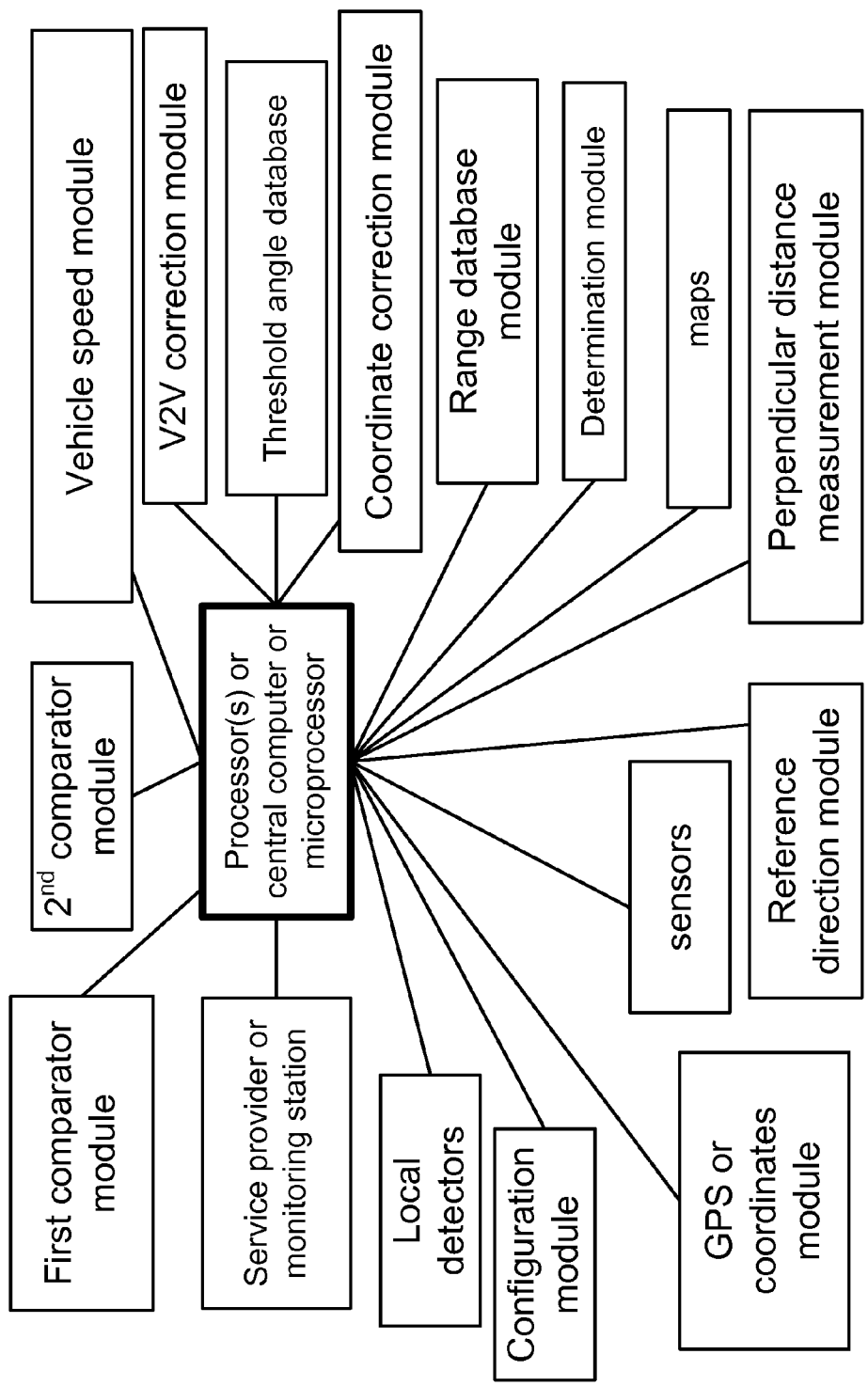
FIG. 32 is for one embodiment of the invention, for a system for map matching algorithm.
Figure 33:
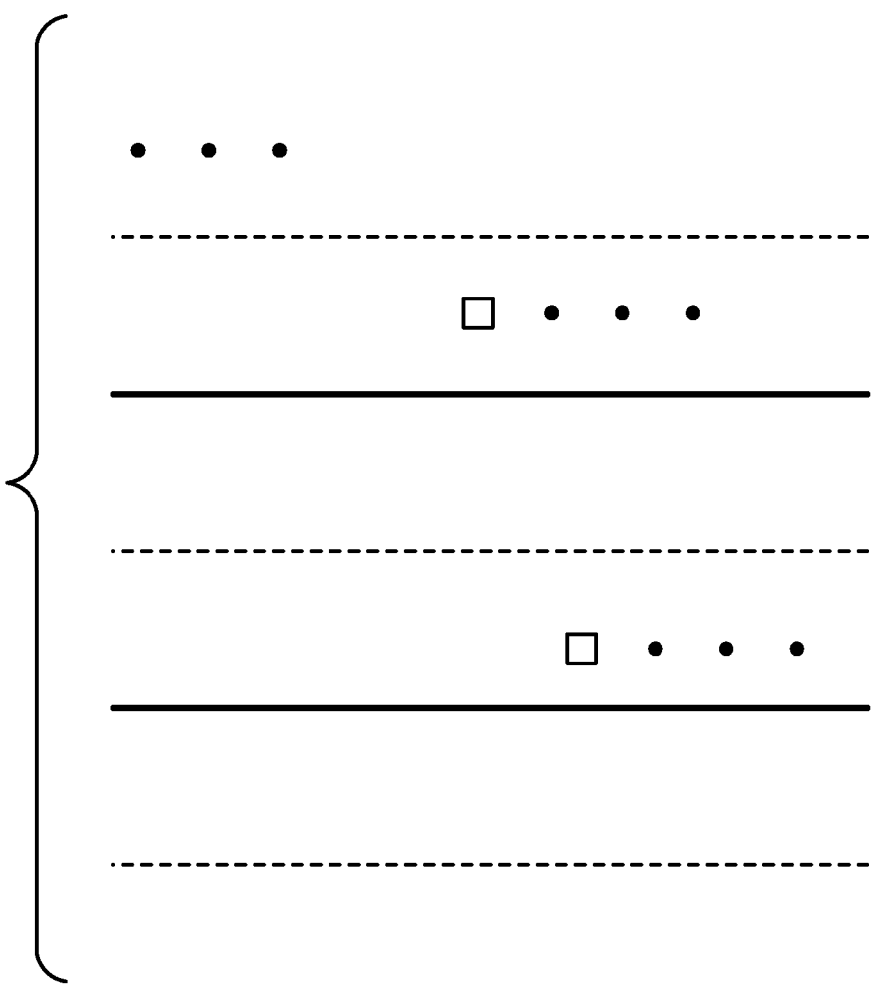
FIG. 33 is for one embodiment of the invention, related to current lane assignment.
Figure 34:
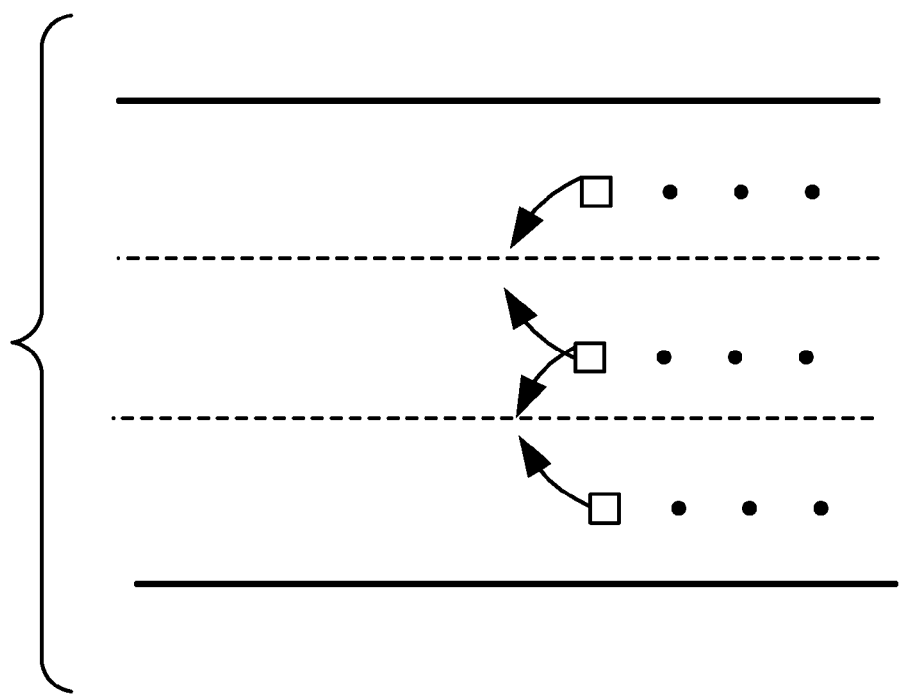
FIG. 34 is for one embodiment of the invention, related to current lane assignment.
Figure 35:
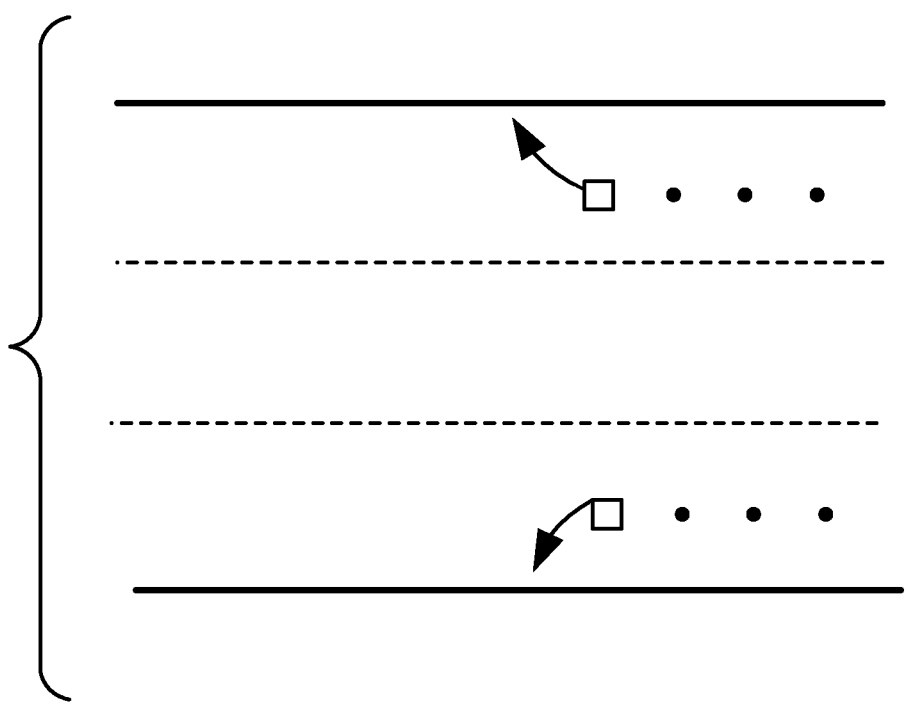
FIG. 35 is for one embodiment of the invention, related to changing lane assignment.
Figure 36:
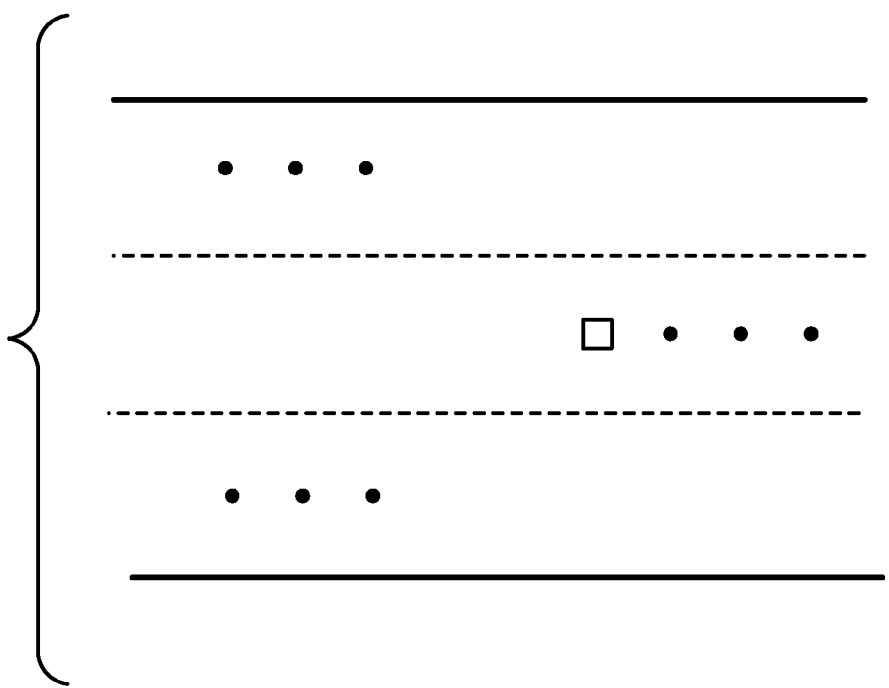
FIG. 36 is for one embodiment of the invention, related to jump in the position to a new lane.

|difnew|<$d_{kk}$

Wherein $d_{kk}$ is a configurable distance, e.g., 1.5 m,
  Wherein difnew corresponds to distance for new road,
  & this condition stays for period of $t_{mm}$
  Wherein $t_{mm}$ is a configurable time period, e.g., 3 sec,
  Then:
  NewRoadAssignment=yes
  Any time we have new lane assignment or new road assignment, we reset the timer and repeat step 3, as explained above.
  FIGS. 18-31 are for multiple embodiments of the invention, for methods for map matching algorithm. FIG. 32 is for one embodiment of the invention, for a system for map matching algorithm. FIGS. 33-34 are for embodiments of the invention, related to current lane assignment. FIG. 35 is for one embodiment of the invention, related to changing lane assignment. FIG. 36 is for one embodiment of the invention, related to jump in the position to a new lane.
  In addition to the above algorithm, the V2V data, when available, can be used to help the entire discussed algorithm steps. If the relative GPS accuracy between the host vehicle and the remote vehicles in the proximity of the host vehicle is enough to separate vehicle in lane, and there are enough vehicles to exist in all lanes of interest, then it becomes an easier job to determine which lane the host vehicle is in, and this can reflect very positively on all the above algorithm steps.
  Clustering and lane determination methods are discussed in our prior parent application, which is incorporated here, by reference, with more details follow below, from our prior application.

Figure 1:
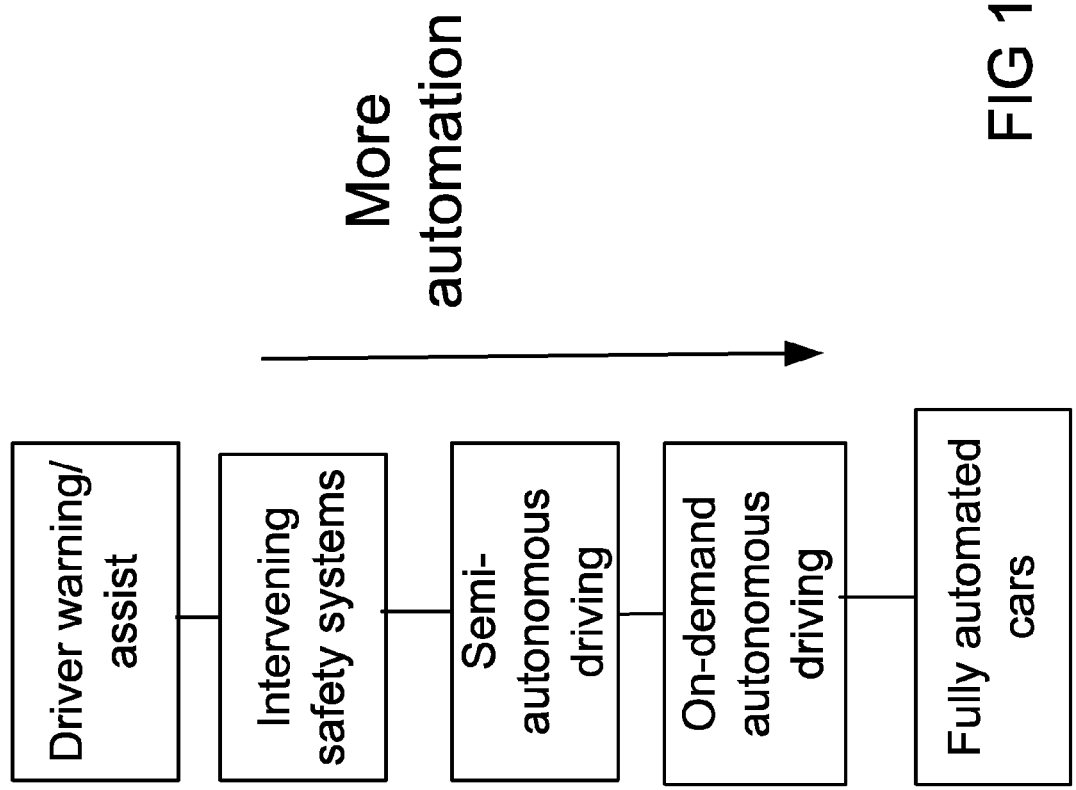
FIG. 1 is for one embodiment, as an example, for representation of development of fully automated vehicles, in stages.
Figure 2:
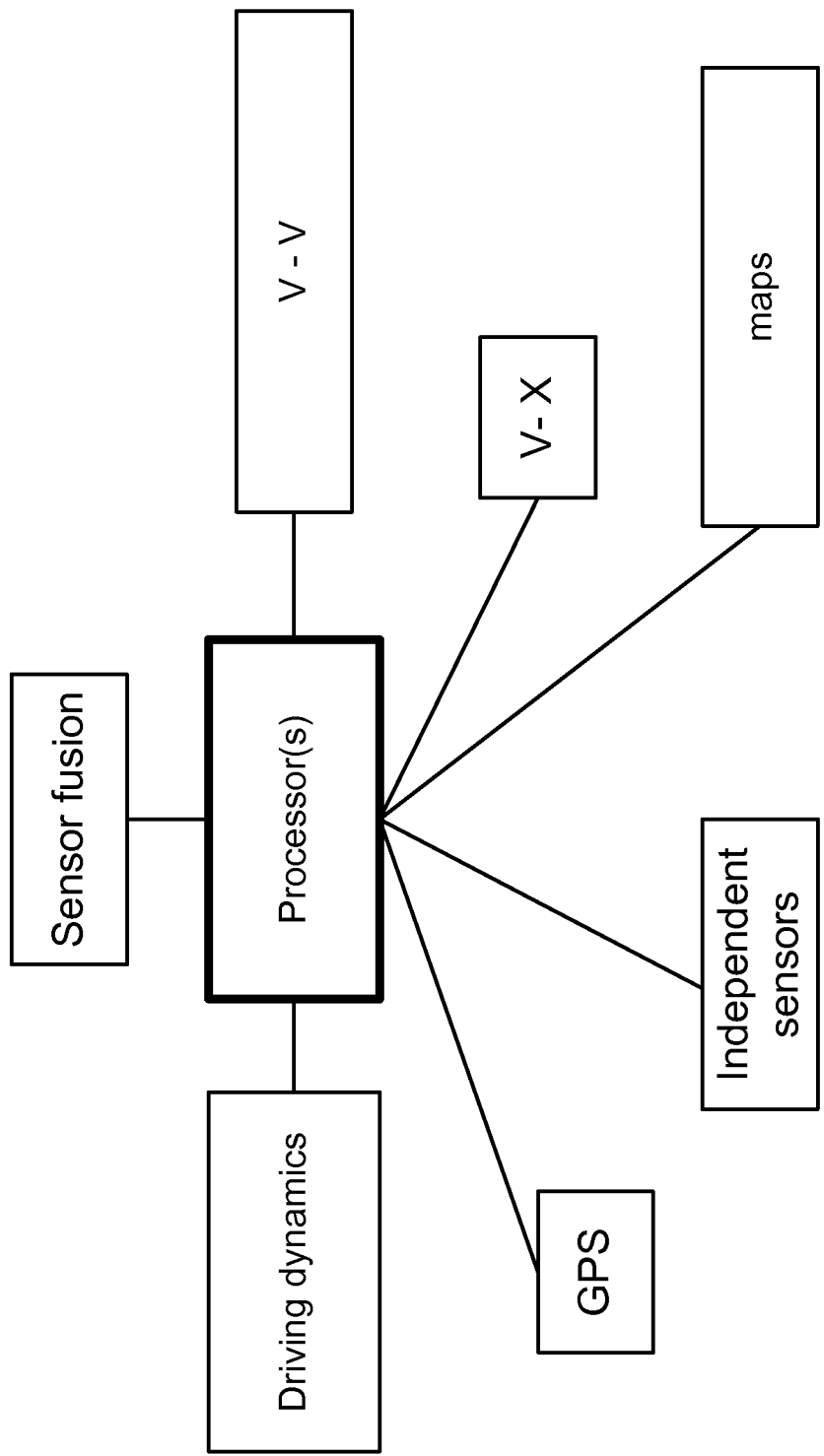
FIG. 2 is for one embodiment of the invention, for a system for automated vehicles.
Figure 3:
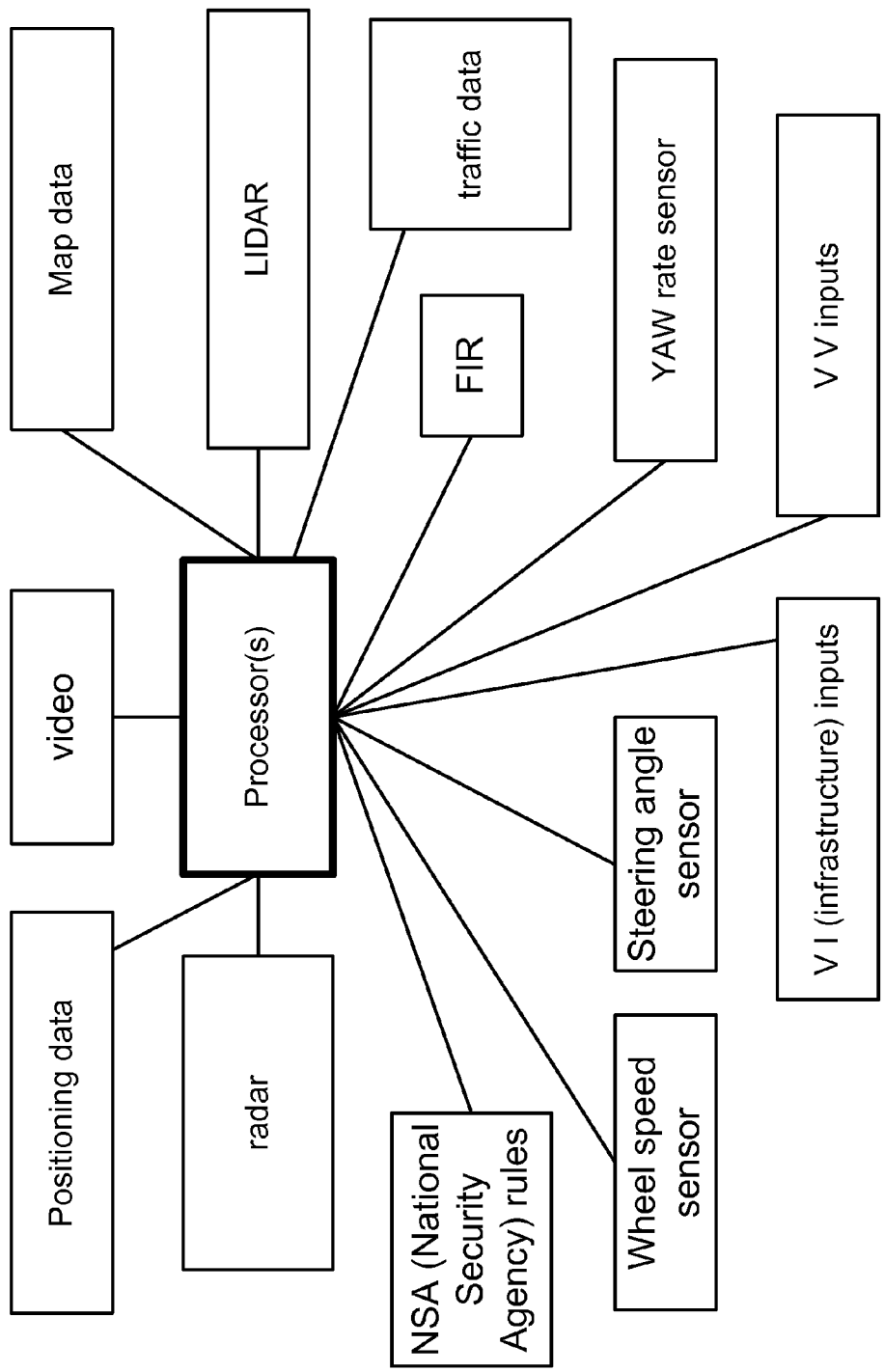
FIG. 3 is for one embodiment of the invention, for a system for automated vehicles.

General System and Other Related Embodiments
  Now, let's look at the general system and other related embodiments:
  FIG. 1 is for one embodiment, as an example, for representation of development of fully automated vehicles, in stages, for progression toward fully automated vehicles. FIG. 2 is for one embodiment of the invention, for a system for automated vehicles, using GPS, independent sensors, and maps, for vehicle interactions, driving dynamics, and sensor fusions and integrations.
  FIG. 3 is for one embodiment of the invention, for a system for automated vehicles, with different measurement devices, e.g., LIDAR (using laser, scanner/optics, photodetectors/sensors, and GPS/position/navigation systems, for measuring the distances, based on travel time for light), radar, GPS, traffic data, sensors data, or video, to measure or find positions, coordinates, and distances. The government agencies may impose restrictions on security and encryption of the communications and data for modules and devices within the system, as the minimum requirements, as the hackers or terrorists may try to get into the system and control the vehicles for a destructive purpose. Thus, all of our components are based on those requirements imposed by the US or other foreign governments, to comply with the public safety.

Figure 4:
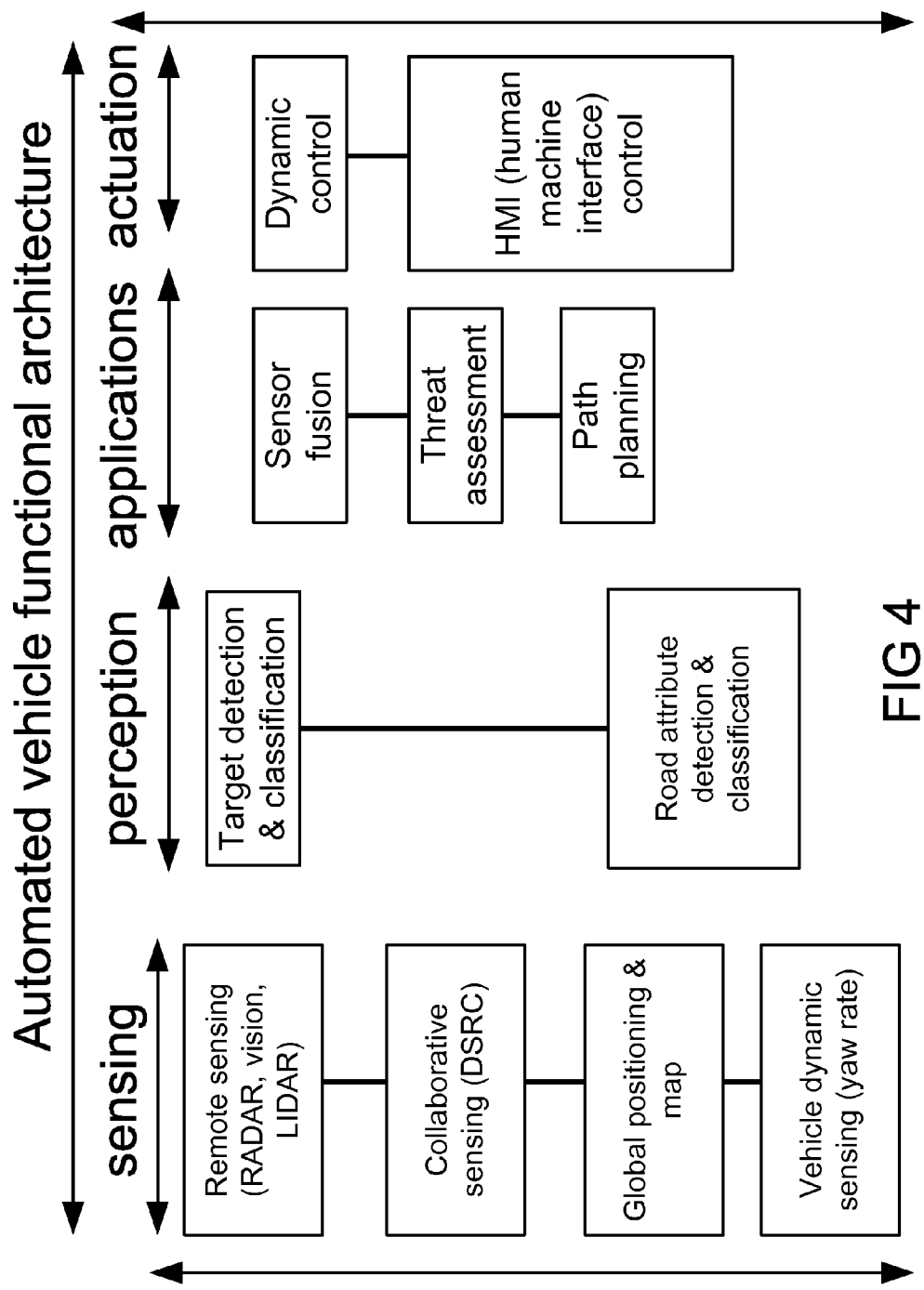
FIG. 4 is for one embodiment of the invention, for automated vehicle functional architecture.
Figure 5:
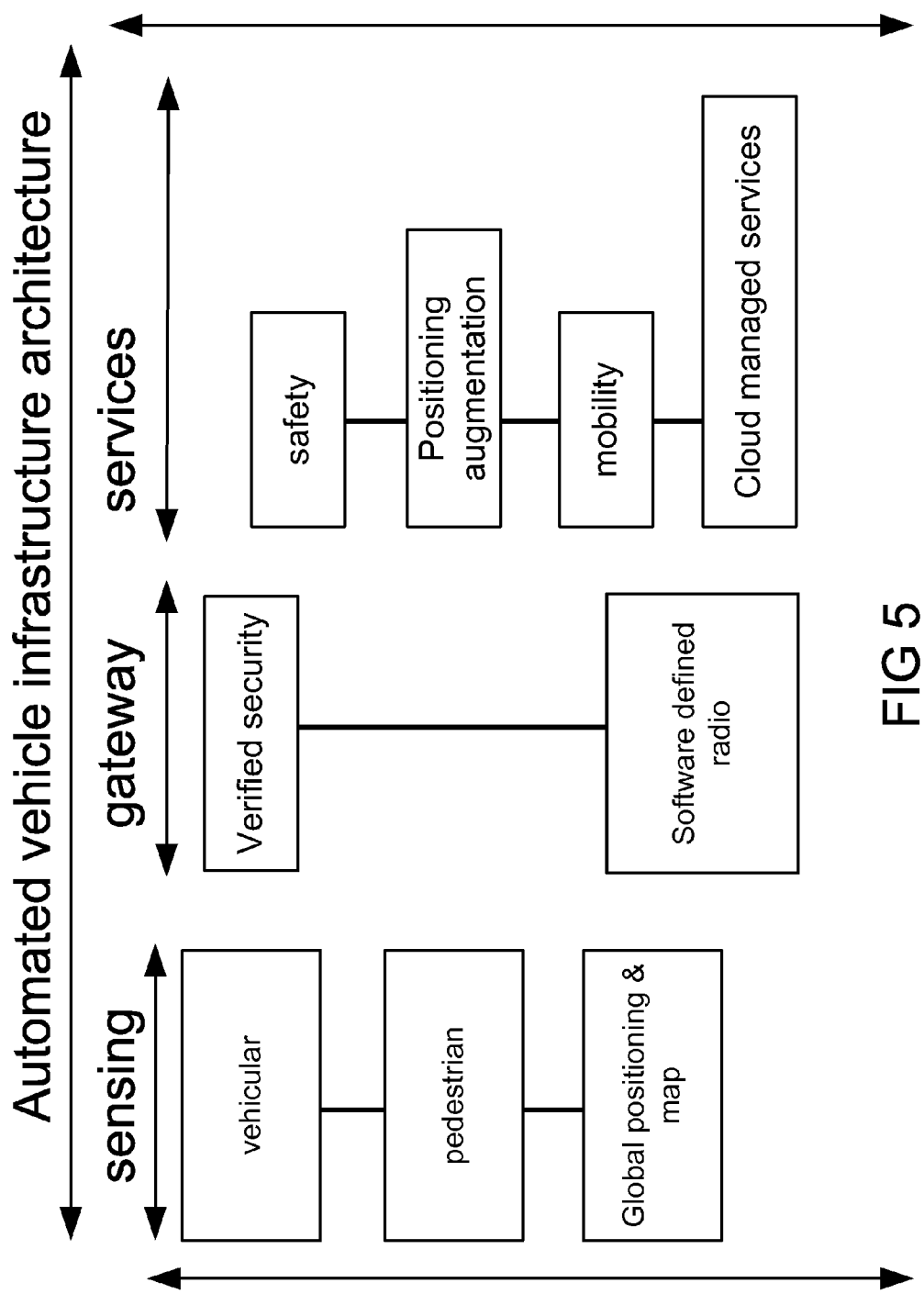
FIG. 5 is for one embodiment of the invention, for automated vehicle infrastructure architecture.

FIG. 4 is for one embodiment of the invention, for automated vehicle functional architecture, for sensing, perception, applications, and actuation. FIG. 5 is for one embodiment of the invention, for automated vehicle infrastructure architecture, for sensing, gateway, and services.

Figure 6:
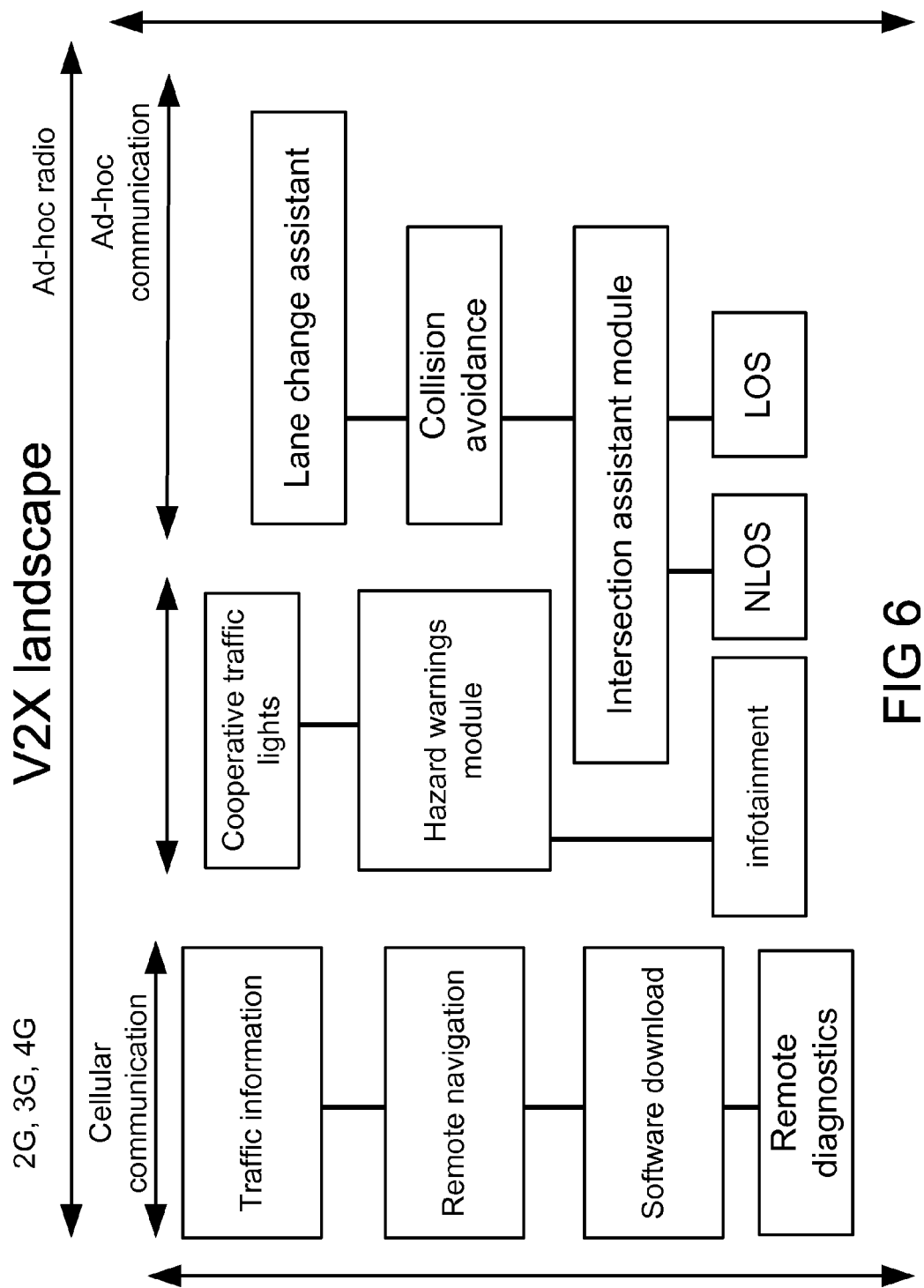
FIG. 6 is for one embodiment of the invention, for a system for V2X landscape, with components.
Figure 7:
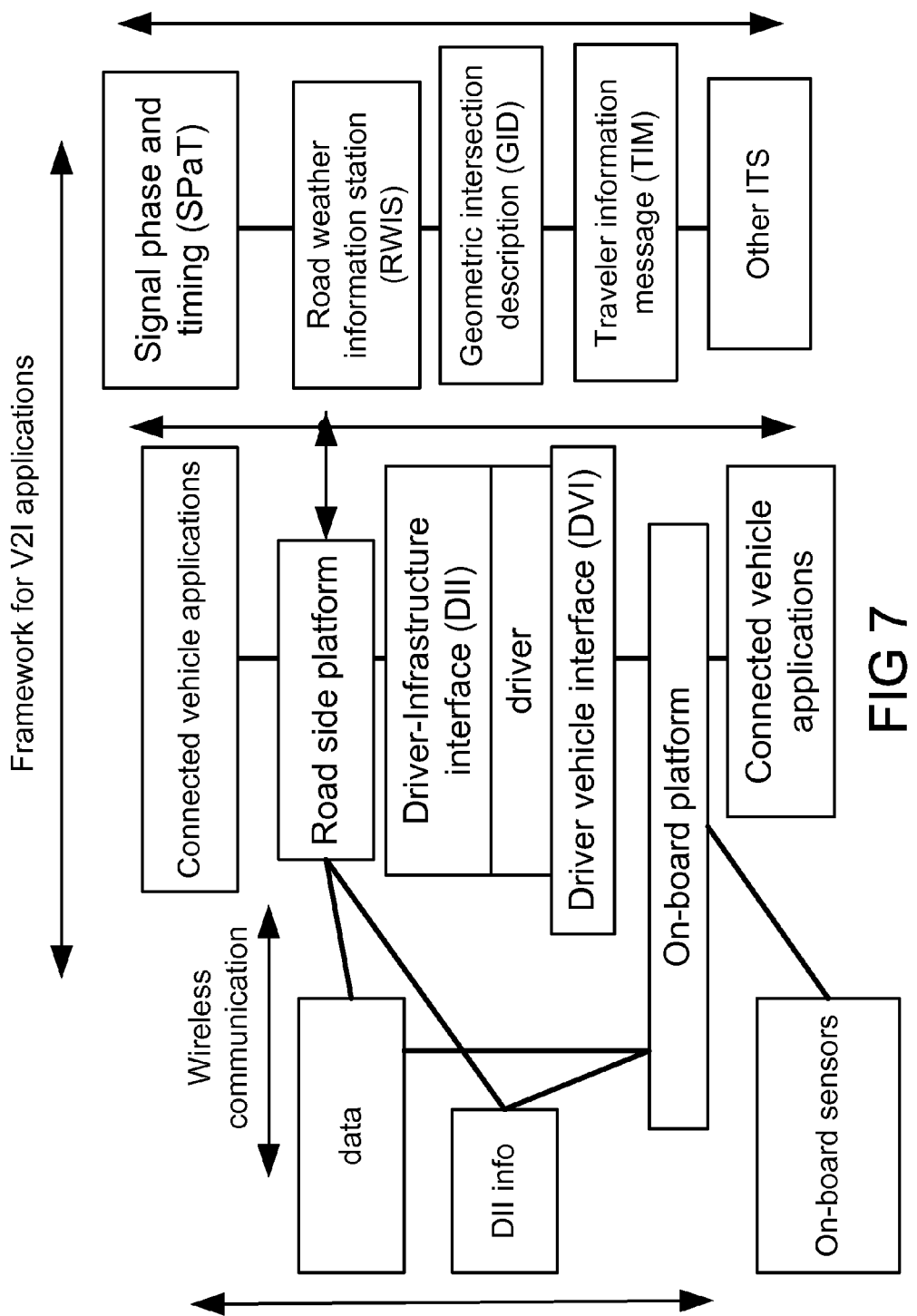
FIG. 7 is for one embodiment of the invention, for a system for framework for V2I applications, with components.

FIG. 6 is for one embodiment of the invention, for a system for V2X landscape, with components, for spectrum and range of frequencies and communications, for various technologies, for various purposes, for different ranges. FIG. 7 is for one embodiment of the invention, for a system for framework for V2I applications, with components, for road-side platform and on-board platform, using various messages and sensors.

Figure 8:
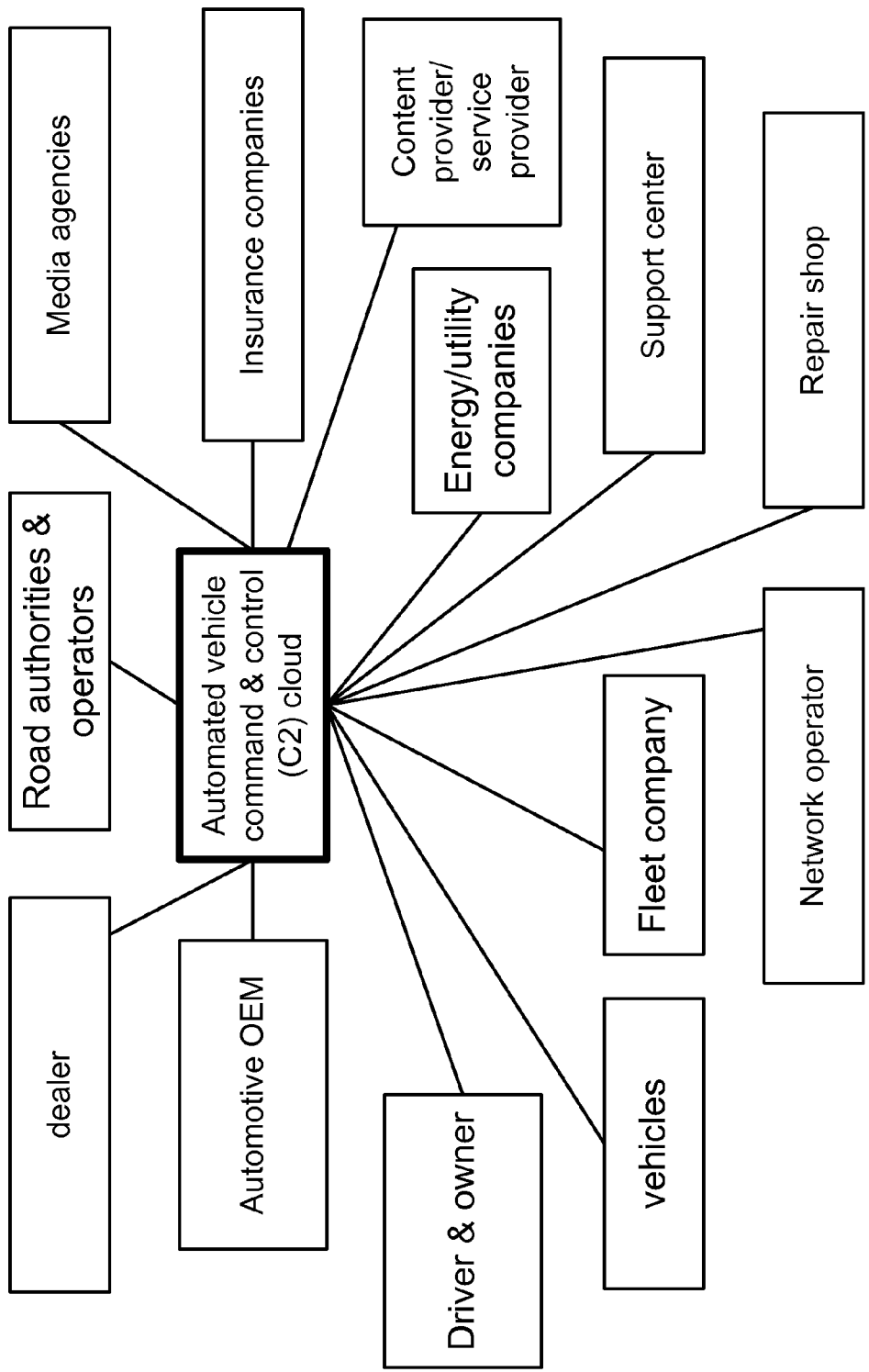
FIG. 8 is for one embodiment of the invention, for a system for automated vehicle command and control (C2) cloud, with components.
Figure 9:
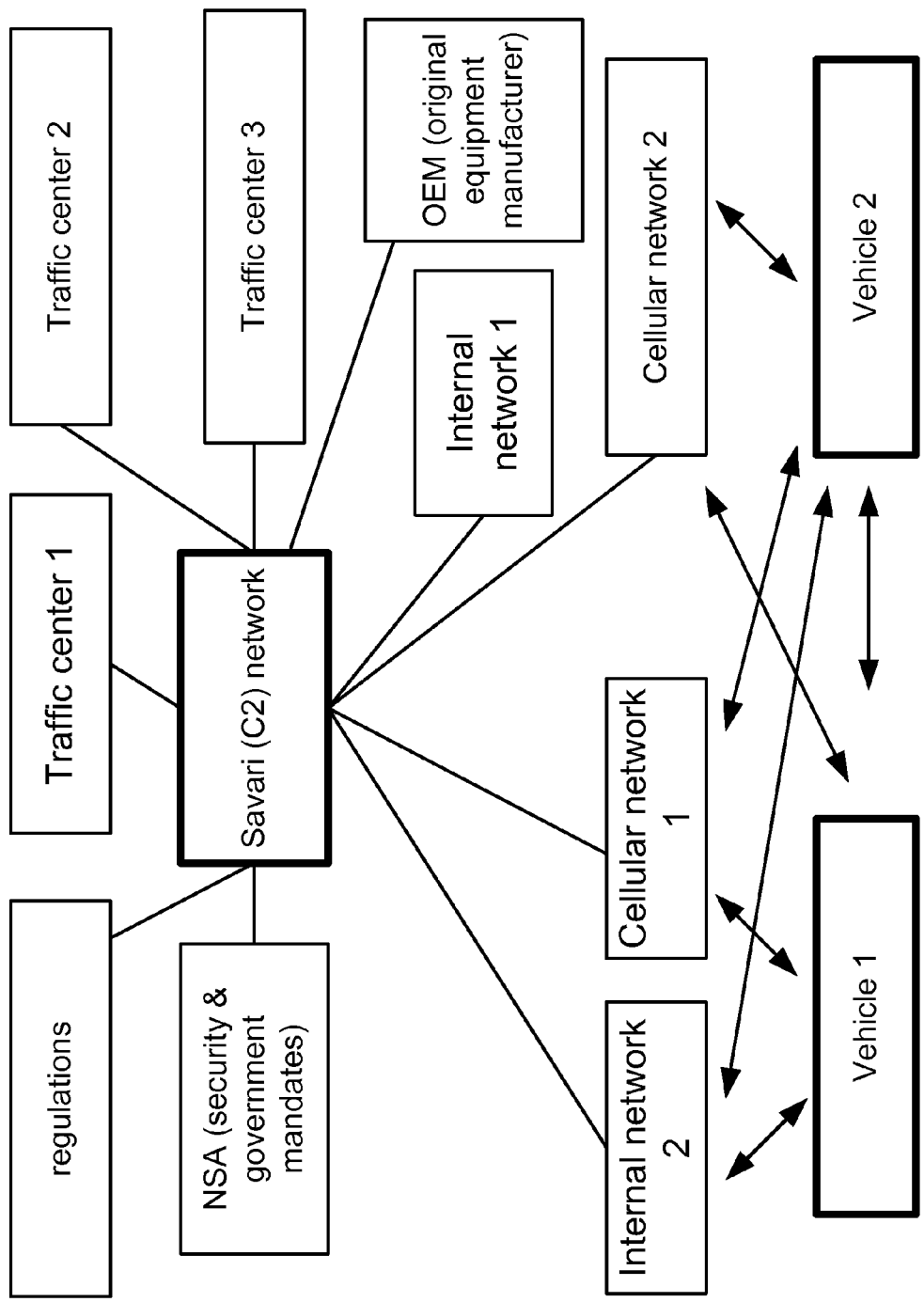
FIG. 9 is for one embodiment of the invention, for a system for Savari C2 network, with components, showing communications between networks and vehicles.

FIG. 8 is for one embodiment of the invention, for a system for automated vehicle command and control (C2) cloud, with components, with various groups and people involved, as user, beneficiary, or administrator. FIG. 9 is for one embodiment of the invention, for a system for Savari C2 network, with components, showing communications between networks and vehicles, using traffic centers' data and regulations by different government agencies.

Figure 10:
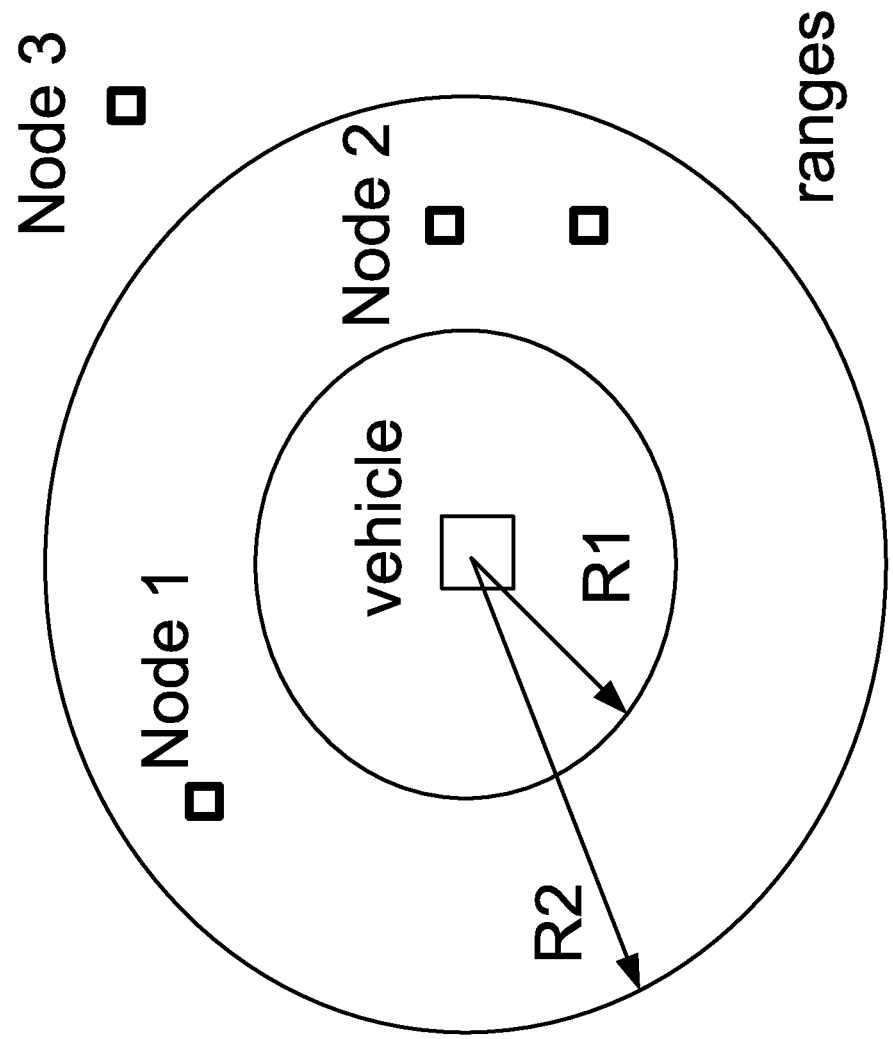
FIG. 10 is for one embodiment of the invention, for a system for host vehicle, range of R values, region(s) defined, multiple nodes or vehicles inside and outside region(s), for communications between networks and vehicles, and warning decisions or filtering purposes.
Figure 11:
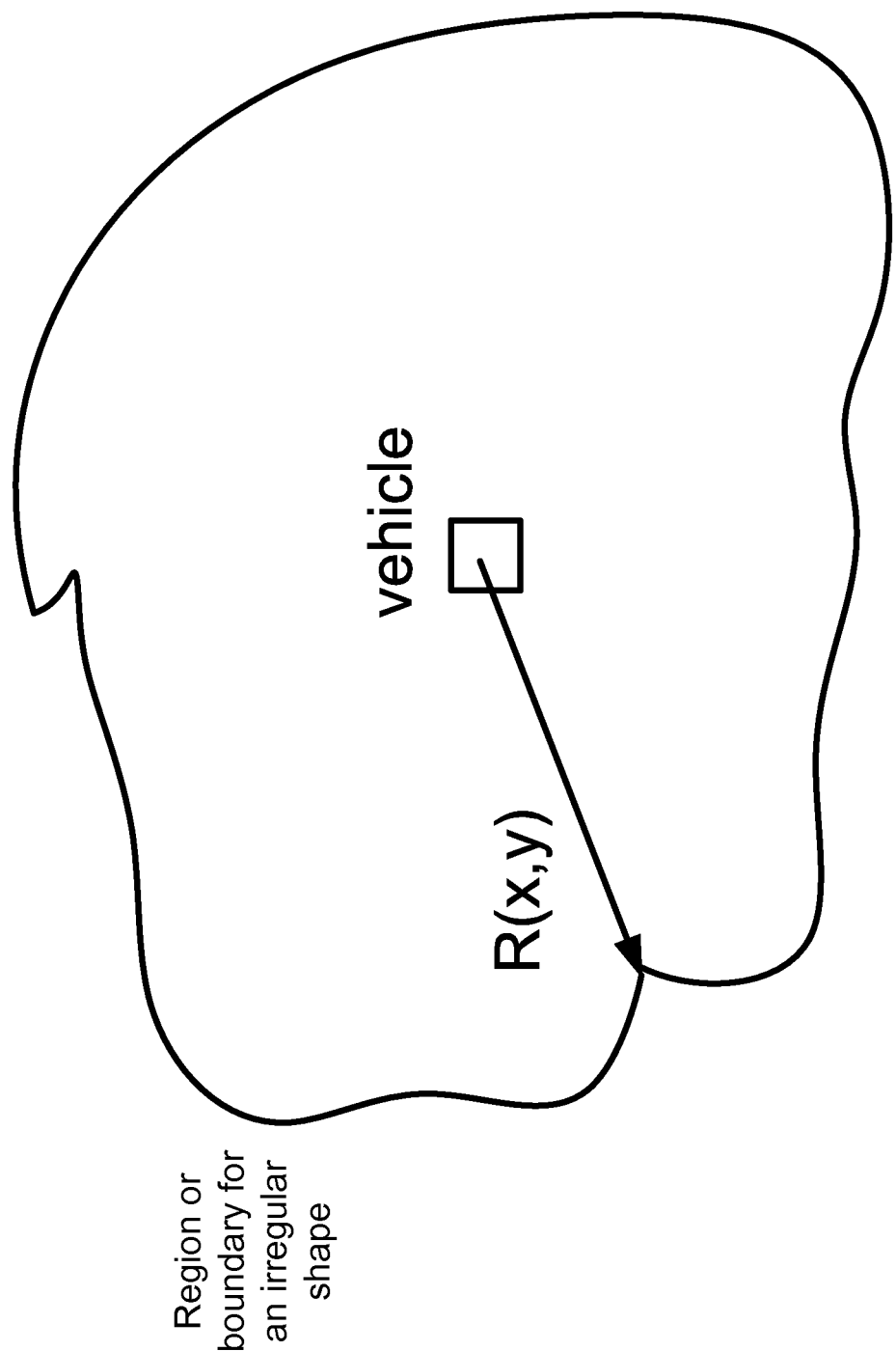
FIG. 11 is for one embodiment of the invention, for a system for host vehicle, range of R values, region(s) defined, for an irregular shape(s), depending on (x,y) coordinates in 2D (dimensional) coordinates, defining the boundaries.

FIG. 10 is for one embodiment of the invention, for a system for host vehicle, range of R values, region(s) defined, multiple nodes or vehicles inside and outside region(s), for communications between networks and vehicles, and warning decisions or filtering purposes, for various filters to reduce computations and reduce the bandwidth needed to handle the message traffic. FIG. 11 is for one embodiment of the invention, for a system for host vehicle, range of R values, region(s) defined, for an irregular shape(s), depending on (x,y) coordinates in 2D (dimensional) coordinates, defining the boundaries, or in 3D for crossing highways in different heights, if connecting.

In one embodiment, we have the following technical components for the system: vehicle, roadway, communications, architecture, cybersecurity, safety reliability, human factors, and operations. In one embodiment, we have the following non-technical analysis for the system: public policy, market evolution, legal/liability, consumer acceptance, cost-benefit analysis, human factors, certification, and licensing.

In one embodiment, we have the following requirements for AV (automated vehicles) system:
Secure reliable connection to the command and control center
Built-in fail-safe mechanisms
Knowledge of its position and map database information (micro and macro maps)
Communication with traffic lights/road side infrastructure
Fast, reliable, and secure
Situational awareness to completely understand its immediate surrounding environment
Requires multiple sensors
Algorithms to analyze information from sensors
Algorithms to control the car, for drive-by-wire capability
In one embodiment, we have the following primary technologies for our system:
V2X communication: time-critical and reliable, secure, cheap, and dedicated wireless spectrum
Car OBE (on-board equipment): sensor integration (vision, radar and ADAS (advanced driver assistance system)), positioning (accurate position, path, local map), wireless module (physical layer (PHY), Media Access Control (MAC), antenna), security (multi-layer architecture), processing and message engine, and algorithms for vehicle prediction and control In one embodiment, we have the following building blocks for AVs:
Automation Platform
  i. Advanced Driver Assistance (ADAS) integration
  ii. Map Integration, Lane Control
  iii. Radio communications support
  iv. Vehicle Controller Unit to do actuation
Base Station
  Ground positioning support to improve positioning accuracy
  V2I (vehicle to infrastructure) functionality, support for public/private spectrums
  Cloud connectivity to provide secure access to vehicles
Command Control Center
  i. Integration with Infrastructure Providers Here are some of the modules, components, or objects used or monitored in our system: V2V (vehicle to vehicle), GPS (Global Positioning System), V2I (vehicle to infrastructure), HV (host vehicle), RV (remote vehicle, other vehicle, or 3rd party), and active and passive safety controls.

Figure 12:
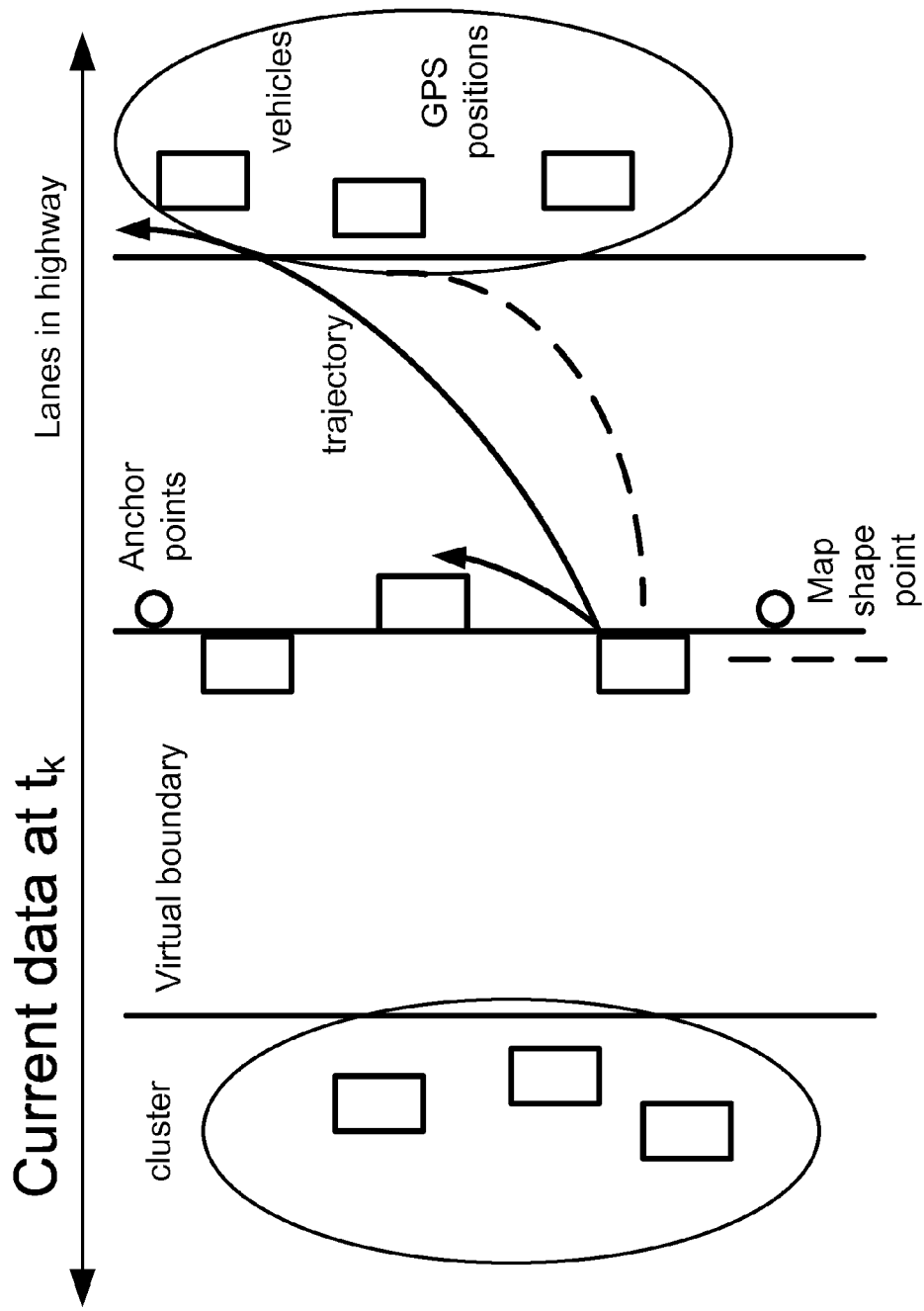
FIG. 12 is for one embodiment of the invention related to virtual boundaries and clustering vehicles.
Figure 13:
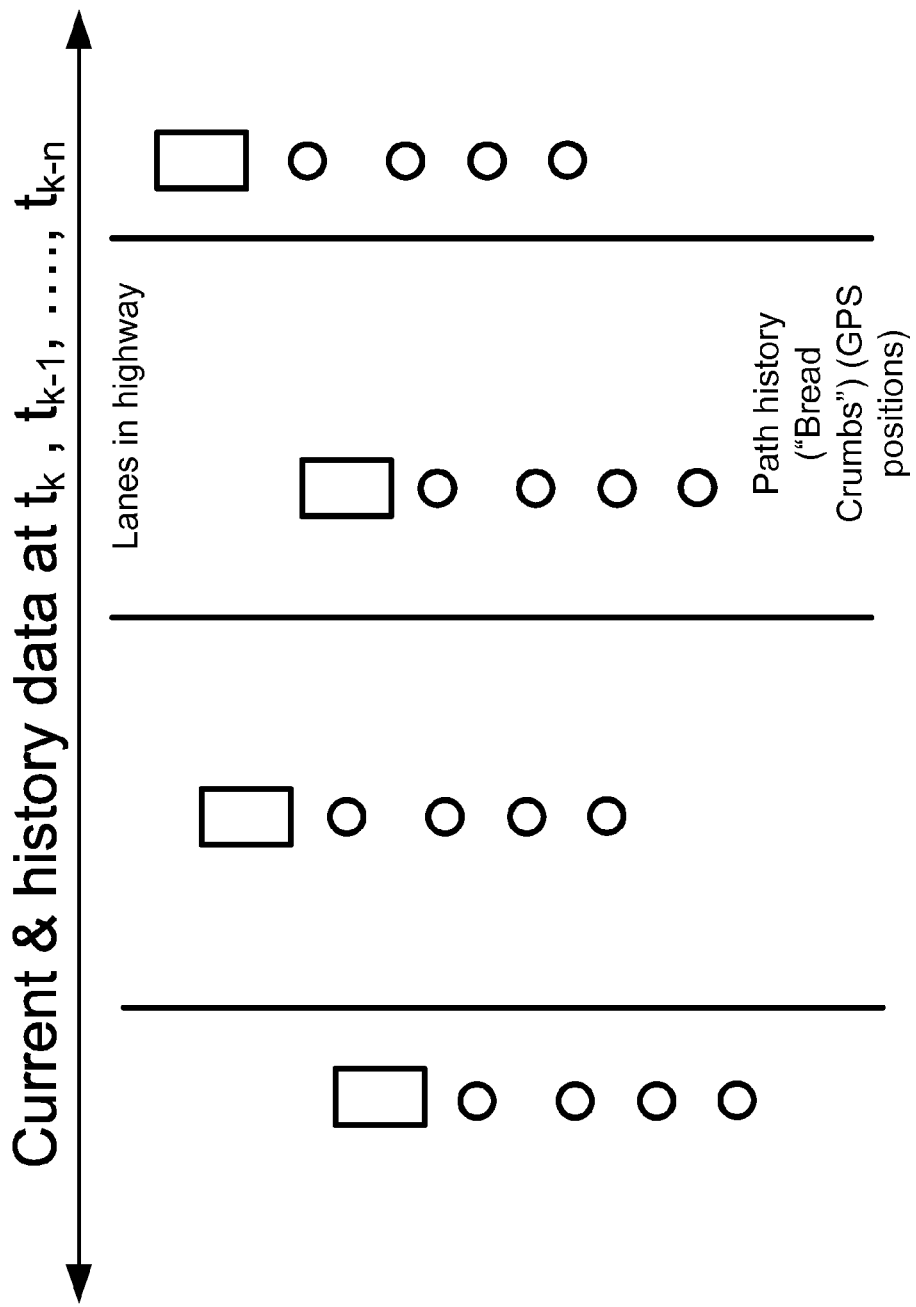
FIG. 13 is for one embodiment of the invention related to current and history of data for vehicles.

FIG. 12 is for one embodiment of the invention related to virtual boundaries and clustering vehicles, to find the location and width of the lanes, with virtual boundaries. FIG. 13 is for one embodiment of the invention related to current and history of data for vehicles, for previous times, tk to tk−n, tracking the vehicles, e.g. with snap shots in time, in a sequence of locations.

Figure 14:
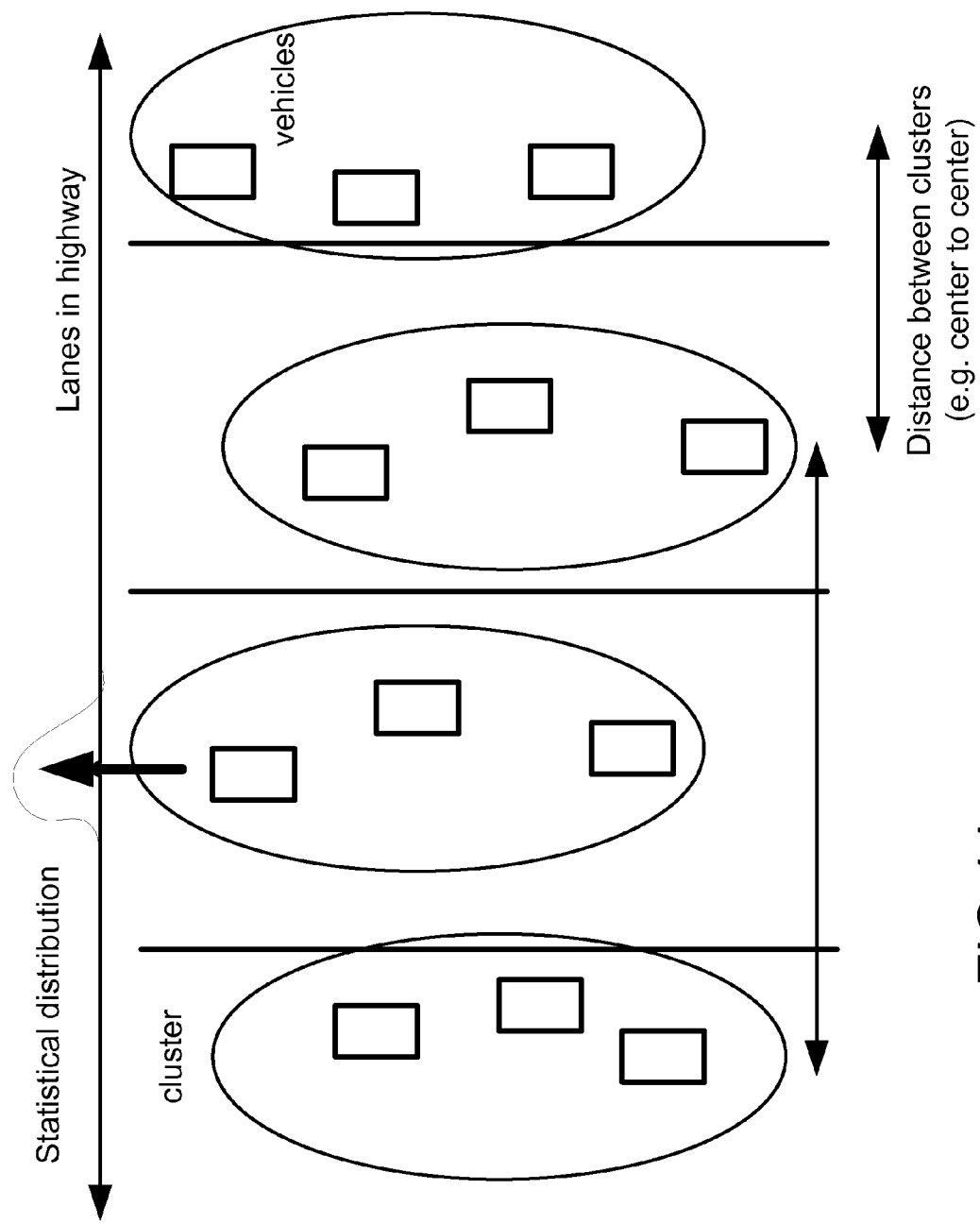
FIG. 14 is for one embodiment of the invention related to clustering, distances between clusters, and statistical distributions for vehicles.

FIG. 14 is for one embodiment of the invention related to clustering, distances between clusters (e.g. center to center, Dcc) (as a multiple integer (K) of a lane width (W)), and statistical distributions for vehicles (to distinguish the clusters, based on distribution curve/statistics, e.g. normal distribution, of the coordinates of vehicles' positions, at various time intervals). So, we have: Dcc=K W
wherein K is a positive integer (as 1, 2, 3, 4, . . . ). Even with 2 lanes, we have 2 clusters, and one Dcc value. Thus, we can get the value for W (with K=1). The more lanes and more clusters (and cars), the more accurate the value for W.

Figure 15:
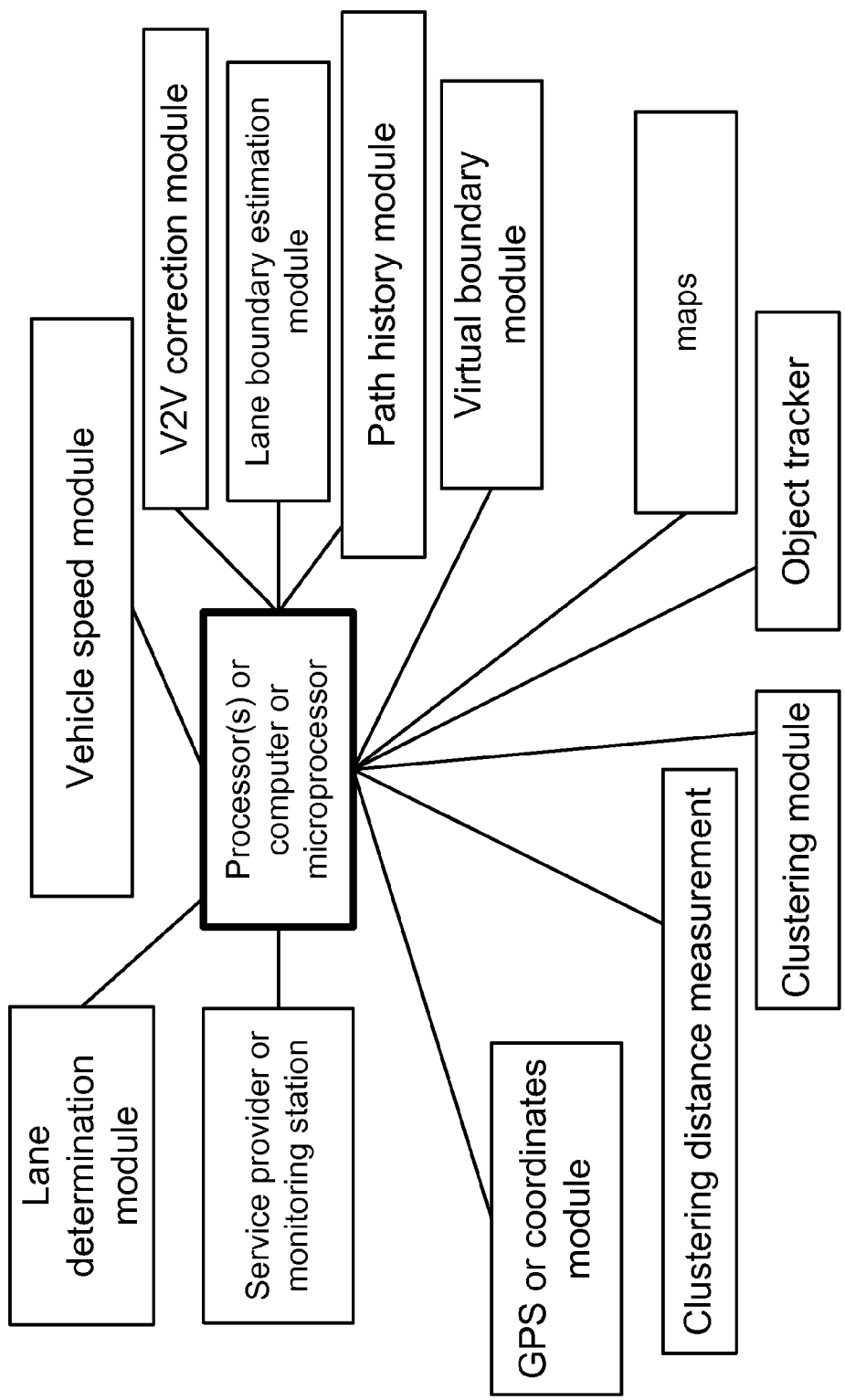
FIG. 15 is for one embodiment of the invention, for a system for lane determination.
Figure 16:
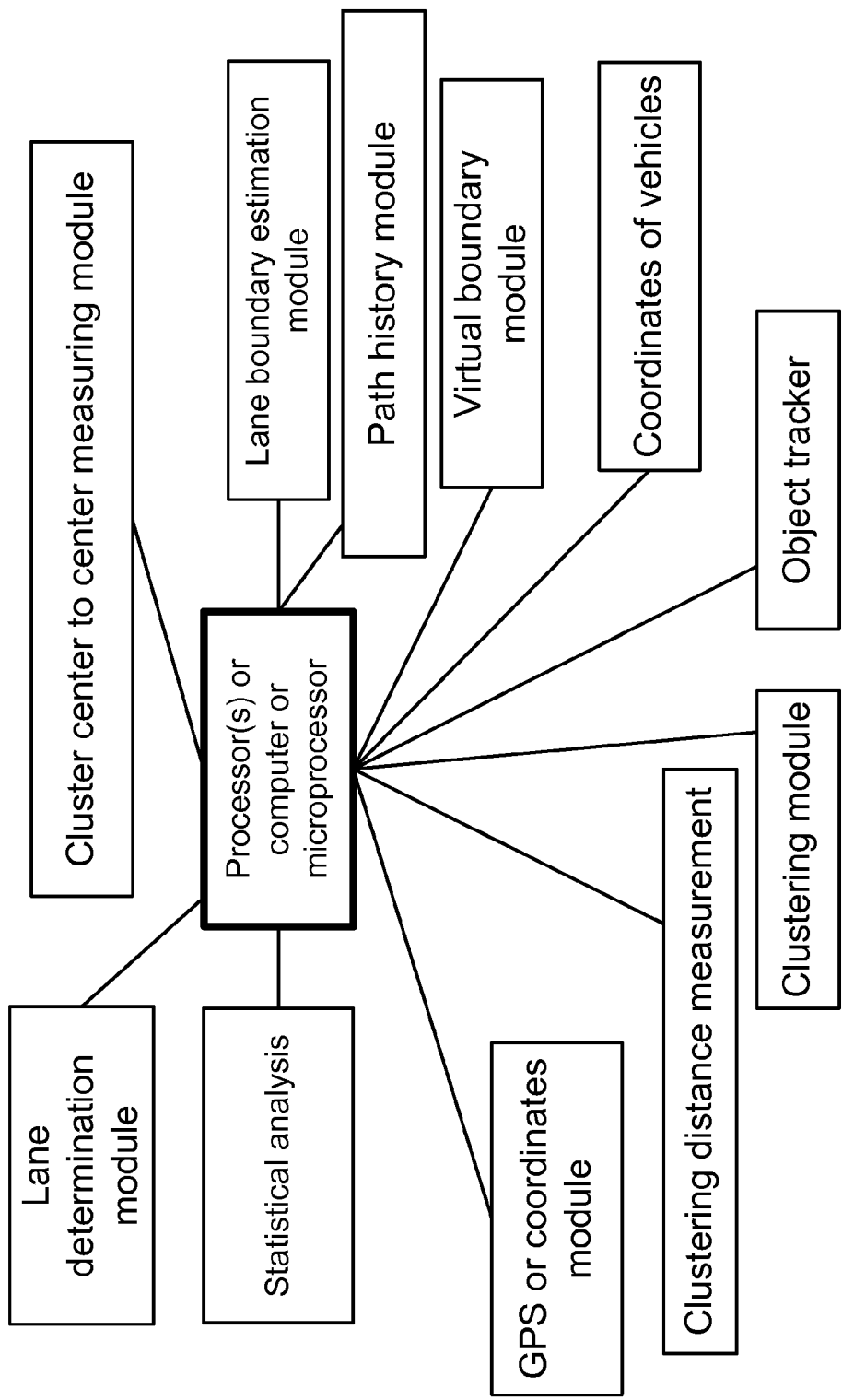
FIG. 16 is for one embodiment of the invention, for a system for clustering.

FIG. 15 is for one embodiment of the invention, for a system for lane determination, based on path history, virtual boundary, maps, GPS, and clustering analysis, determination, and distance measurements. FIG. 16 is for one embodiment of the invention, for a system for clustering, based on statistical analysis, distance measurements, and history, e.g. matching and setting the center of the corresponding cluster with the location of peak of the statistical curve in FIG. 14, in each of the 2 dimensional axes, for X and Y coordinates. This gives us the 2 coordinates of the cluster center for each cluster. Then, from those coordinates, the distances between the centers of the 2 clusters can be obtained, in each direction or axis, as a subtraction or difference of values, which yields the width of a lane, in one of those 2 directions.

Figure 17:
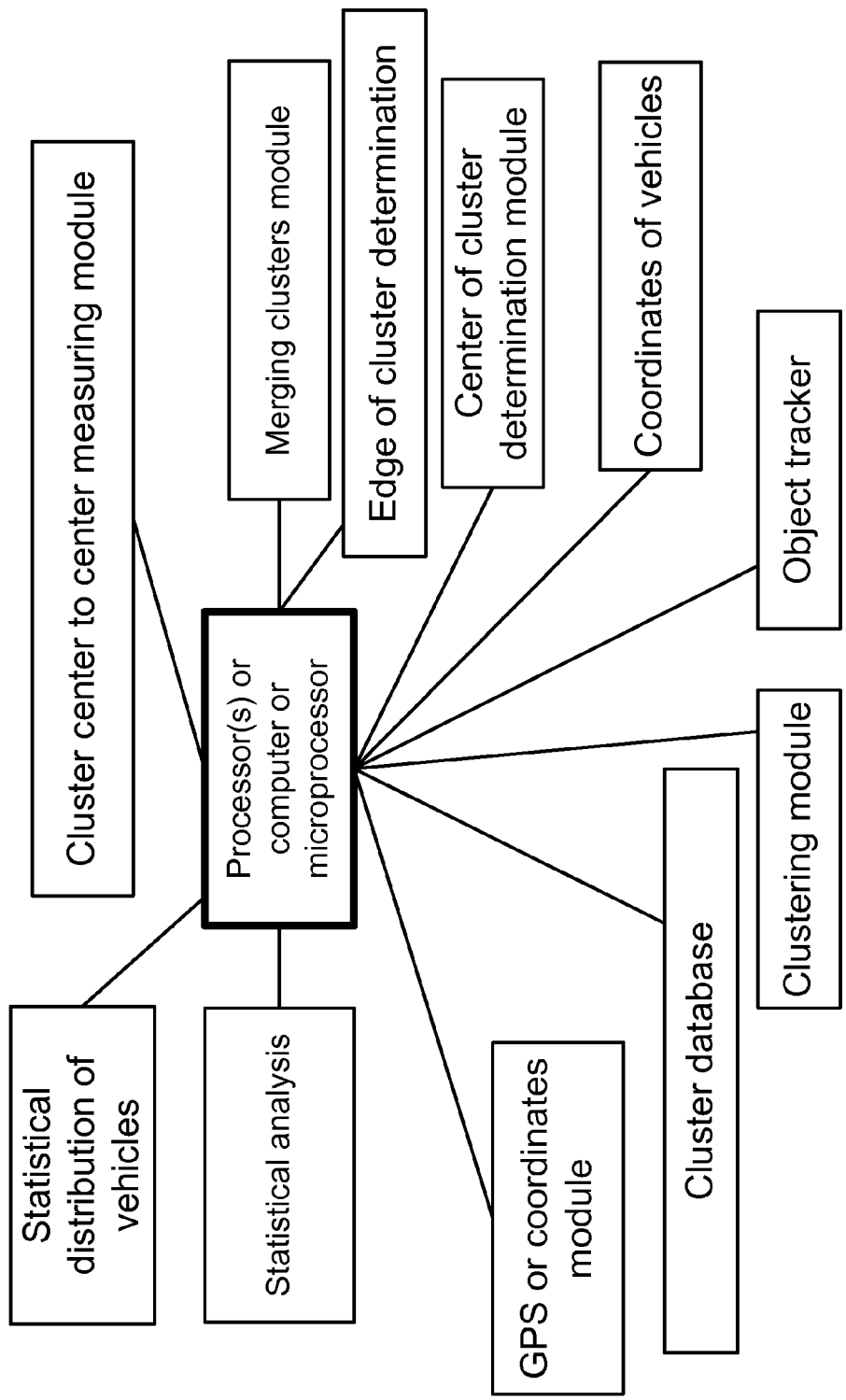
FIG. 17 is for one embodiment of the invention, for a system for clustering and cluster analysis.

FIG. 17 is for one embodiment of the invention, for a system for clustering, based on statistical analysis, statistical distribution of vehicles, clusters' center-to-center measurements, merging overlapping clusters (if they belong to the same cluster), edge of cluster determination, and coordinates of vehicles, to determine regions and lanes, as shown above.

Here, we describe a method, as one embodiment, for Lane Boundary Estimation:

The lane boundary estimation method uses fused data from nodes (vehicles) current positions, positions history (path history), host vehicle position and path history, host vehicle dynamics (speed, yaw rate, and for some embodiments, acceleration), map database geometrical shape points and attributes, and the dynamic of the vectors that connect the host vehicle with other remote vehicles. (See FIGS. 12-14.)

To estimate the lane boundaries locations (virtual boundaries), it is required to estimate the road shape, lane width, and a placement technique. To do that, let us look at FIG. 12 and FIG. 13, as an example:

The map database provides very accurate representation of the geometric shape of the road.

The path history can also provide a good representation of the road geometry.

The vehicles (nodes) positions distribution can also provide a good representation of the road geometry. If there are not enough vehicles to estimate road geometry, a combined path history and current vehicles distribution can be used to estimate the road geometry, to extrapolate or interpolate between them.

Based on the estimated geometry, the vehicles can be grouped/clustered in each lane. This can be performed using a straight piecewise clustering algorithm, spline-based, or an incremental clustering algorithm. Other methods may also be used. Basically, when the road curvature data is available, any clustering method will be based on matching the vehicle positions to a longitudinal grid of the road representation. (See FIGS. 12-14.)

Only vehicles that their heading angle measurement (GPS measurements) aligned with the forward road heading will have high confidence to be a good data. The vectors can be used here, as one example. As one example, the direction matching can be done by dot-products of 2 vectors (V1 and V2):

$$V1 V2 \cos \alpha$$

wherein $\alpha$ is the angle between the 2 vectors (V1 and V2). Note that for perfectly aligned vectors, we have $\alpha$ equal to zero, or ($\cos \alpha = 1$) (or at maximum value).

Once every lane cluster is established, a combination of clusters separation distances are calculated (see FIG. 12). One method is the following, as an example:

1—Calculate lateral distance (perpendicular to the road tangent) between host lane cluster and all other lane clusters, and between all lane clusters. For example, in FIG. 12, we have the average distance between cluster M (middle one) and cluster L (left one) (distance_ML), the average distance between cluster M and cluster R (right one) (distance_MR), and the average distance between clusters L and R (distance_LR).

2—Let us assume, as an example, that distance_ML=3 meter, distance_MR=4 meter, and distance_LR=7.2 meter. Then, an average lane width is between 3 and 4 meter. Therefore, distance_ML corresponds to one lane width, distance_MR corresponds to one lane width, and distance_LR correspond to two lane width. Therefore, an estimated lane width can be calculated: ((3+4+(7.2/2))/3)=3.53 meter. (See FIGS. 12-14.)

3—Now, we would like to establish where the virtual boundaries are located. The middle of the host lane is estimated (as one example) as the line that is located at the average between the line that is generated from left-shifting the right cluster line by one lane width and the line that is generated from the right-shifting the left cluster line by one lane width. (See FIGS. 12-14.)

4—Other lanes are distributed, by shifting this middle host lane by one lane width. (See FIGS. 12-14.)

5—Once middle line is established and the lane width is estimated, the virtual lane boundary locations are estimated/found (see FIGS. 12-13).

6—The number of lanes map database attributes can also be used in the above calculations, as one embodiment. For example, using the number of lanes limits or determines the width of the whole road, the location of the shoulders, and expectation of locations of the cars in different lanes. (See FIGS. 12-14.)

Next, let us look at the Host Vehicle Position and Orientation within the host lane:

Now, the left and right host vehicle virtual boundaries and host vehicle middle lane are estimated. The host vehicle position is known. Therefore, the vehicle position with respect to the middle line and/or to the left and right boundaries can be easily calculated from the above values (see FIGS. 12-13), using difference of distances or values (see FIGS. 12-13), as they all refer to the same position or location on the road (or on the road coordinate system), from both ways.

The heading angle of the road at the vehicle position can be calculated from the road geometry estimation. Also, the vehicle heading angle is obtained from the GPS data. Therefore, the heading angle with respect to the lane can be calculated easily by differencing the two values. These two parameters (position and heading angle with respect to the host lane) can be used to design an LDW system, as an example.

Another method to do the estimating of these two parameters is using modeling and estimation. All of the above measurements, in addition to the vector representation that connect the host vehicle with other vehicles and the host vehicle yaw rate, can be fused together (in a state model), to estimate these two main parameters (position and heading with respect to the lane). For example, we have:

$$dD/dt = \sin(\text{Heading}) * \text{HostSpeed}$$

$$d\text{Heading}/dt = \text{RoadCurvature} - (\text{HostSpeed} * \text{YawRate})$$

$$d\text{RoadCurvature}/dt = 0$$

wherein D is the distance from the middle of the host lane, Heading is the heading or direction or angle with respect to the road, RoadCurvature is the curvature of the road, "t" is the time, HostSpeed is the speed of the host vehicle, YawRate is the rate of yaw (e.g., related to vehicle's angular velocity, or e.g., which can be measured with accelerometers, in the vertical axis), and (d( )/dt) denotes the derivative of a function or a variable with respect to variable "t".

Other models of curvature can also be used, such as the Clothoid model. For the Clothoid, e.g., as one embodiment, the curvature varies linearly with respect to the parameter t. It is one of the simplest examples of a curve that can be constructed from its curvature. There are also Clothoids whose curvature varies as the n-th power of the parameter t, as another embodiment.

The measurements for the above state model can be the following parameters or set, as one example: {vector between the host vehicle and other vehicles (range and angle), curvature, heading difference, difference in position}.

Now, let us look at the advantages (comparison):

Estimating lane boundaries, when vision system does not exists, or exists, but not fully functional.

In an automated system, it will be very difficult to detect and track all lane boundaries using a vision system, due to multiple reasons: limited Field of View (FOV) coverage, difficulty seeing lane marking in high traffic scenario, or challenges facing vision system in different environment conditions (e.g., poor lane marking, challenging weather, such as ice, snow, or leaves, challenging lighting conditions, upcoming curves at nights, or the like).

Poor availability of LDW system in the above conditions, stated in the section above.

V2V active safety systems/ADAS are for vehicle to vehicle threat, and not intended for road attribute threats, such as drifting away in your lane, as in LDW system.

As shown above, the advantages of our methods are very clear over what the current state-of-the-art is, e.g. using vision systems.

In this disclosure, any computing device, such as processor, microprocessor(s), computer, PC, pad, laptop, server, server farm, multi-cores, telephone, mobile device, smart glass, smart phone, computing system, tablet, or PDA can be used. The communication can be done by or using sound, laser, optical, magnetic, electromagnetic, wireless, wired, antenna, pulsed, encrypted, encoded, or combination of the above. The vehicles can be car, sedan, truck, bus, pickup truck, SUV, tractor, agricultural machinery, entertainment vehicles, motorcycle, bike, bicycle, hybrid, or the like. The roads can be one-lane county road, divided highway, boulevard, multi-lane road, one-way road, two-way road, or city street. Any variations of the above teachings are also intended to be covered by this patent application.

The invention claimed is:

1. A method for map matching for control of a vehicle in a highway or street, said method comprising:
   a central computer defining a reference direction;
   said central computer defining a lane direction with respect to said reference direction;
   said central computer defining a vehicle direction for said vehicle, with respect to said reference direction;
   said central computer defining a region of interest for a map matching calculation;
   said central computer defining lanes of interest for said map matching calculation;
   said central computer calculating a first perpendicular distance for a first lane among said lanes of interest in said highway or street;
   said central computer calculating a second perpendicular distance for a second lane among said lanes of interest in said highway or street;
   a determination module matching a position of said vehicle to a specific lane, based on a first comparator module and a second comparator module;
   wherein said first comparator module finds a minimum of said first perpendicular distance and said second perpendicular distance, with respect to said position of said vehicle relative to said specific lane;
   a configuration module setting a threshold angle;
   wherein said second comparator module confirms that an angle between said lane direction and said vehicle direction is smaller than said threshold angle.

2. The method for map matching for control of a vehicle in a highway or street, as recited in claim 1, said method comprising:
   determining if a matched lane is a right-most lane, a left-most lane, or an inner lane.

3. The method for map matching for control of a vehicle in a highway or street, as recited in claim 1, said method comprising:
   determining values of confidence of a matched lane being a right-most lane, a left-most lane, or an inner lane.

4. The method for map matching for control of a vehicle in a highway or street, as recited in claim 1, said method comprising:
   determining if said first perpendicular distance is larger than a threshold distance.

5. The method for map matching for control of a vehicle in a highway or street, as recited in claim 1, said method comprising:
   determining values of confidence of match and position.

6. The method for map matching for control of a vehicle in a highway or street, as recited in claim 1, said method comprising:
   determining value of correction.

7. The method for map matching for control of a vehicle in a highway or street, as recited in claim 1, said method comprising:
   determining if a condition holds for at least a specified period of time.

8. The method for map matching for control of a vehicle in a highway or street, as recited in claim 1, said method comprising:
   determining if a condition holds for at least a specified percentage of time.

9. The method for map matching for control of a vehicle in a highway or street, as recited in claim 1, said method comprising:
   determining a lane change event flag and applying said lane change event flag.

10. The method for map matching for control of a vehicle in a highway or street, as recited in claim 1, said method comprising:
    taking an average of distances.

11. The method for map matching for control of a vehicle in a highway or street, as recited in claim 1, said method comprising:
    clearing a lane change event flag, when turning event flag is set.

12. The method for map matching for control of a vehicle in a highway or street, as recited in claim 1, said method comprising:
    determining branching geometry and applying a branching flag.

13. The method for map matching for control of a vehicle in a highway or street, as recited in claim 1, said method comprising:
    classifying a road as straight, right, or left.

14. The method for map matching for control of a vehicle in a highway or street, as recited in claim 1, said method comprising:
    taking a minimum of two angles.

15. The method for map matching for control of a vehicle in a highway or street, as recited in claim 1, said method comprising:
    determining a turning event flag and applying said turning event flag.

16. The method for map matching for control of a vehicle in a highway or street, as recited in claim 1, said method comprising:
    performing a new lane assignment.

17. The method for map matching for control of a vehicle in a highway or street, as recited in claim 1, said method comprising:
    determining if said vehicle's position is jumping to a new lane.

18. The method for map matching for control of a vehicle in a highway or street, as recited in claim 1, said method comprising:
    determining if said vehicle's position is transitioning to a new lane gradually.

19. The method for map matching for control of a vehicle in a highway or street, as recited in claim 1, said method comprising:
    performing a changing road assignment.

20. The method for map matching for control of a vehicle in a highway or street, as recited in claim 1, said method comprising:

processing relative global positioning coordinate data to determine lane assignment.

21. The method for map matching for control of a vehicle in a highway or street, as recited in claim 1, said method comprising:

applying a threshold angle for comparison for a rule or condition and accounting for a bias in heading angle or direction.

\* \* \* \* \*